(12) United States Patent
Sawabe et al.

(10) Patent No.: US 12,254,768 B2
(45) Date of Patent: Mar. 18, 2025

(54) REMOTE MONITORING APPARATUS, REMOTE MONITORING METHOD, AND REMOTE MONITORING SYSTEM

(71) Applicant: NEC Corporation, Tokyo (JP)

(72) Inventors: Anan Sawabe, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 251 days.

(21) Appl. No.: 18/017,172

(22) PCT Filed: Jul. 31, 2020

(86) PCT No.: PCT/JP2020/029434
§ 371 (c)(1),
(2) Date: Jan. 20, 2023

(87) PCT Pub. No.: WO2022/024345
PCT Pub. Date: Feb. 3, 2022

(65) Prior Publication Data
US 2023/0274638 A1    Aug. 31, 2023

(51) Int. Cl.
*G08G 1/09* (2006.01)
*G08G 1/01* (2006.01)
*H04L 43/087* (2022.01)

(52) U.S. Cl.
CPC .......... *G08G 1/093* (2013.01); *G08G 1/0125* (2013.01)

(58) Field of Classification Search
CPC ..... G08G 1/093; G08G 1/0125; H04L 43/087
See application file for complete search history.

(56) References Cited

U.S. PATENT DOCUMENTS

2018/0351839 A1* 12/2018 Shirasuka ........... H04L 41/0681

FOREIGN PATENT DOCUMENTS

| WO | 2017/154296 A1 | 9/2017 |
| WO | 2019/093374 A1 | 5/2019 |

OTHER PUBLICATIONS

International Search Report for PCT Application No. PCT/JP2020/029434, mailed on Nov. 2, 2020.

* cited by examiner

*Primary Examiner* — Paul Danneman
(74) *Attorney, Agent, or Firm* — Sughrue Mion, PLLC

(57) ABSTRACT

A remote monitoring system (100) according to the present disclosure includes: an observation unit (101) configured to observe traffic in a network that corresponds to a movement section where a mobile object moves, the mobile object serving as a target to be monitored; and a specification unit (102) configured to divide the movement section on the basis of the observed traffic, and specify a delay jitter distribution in each divided section.

18 Claims, 22 Drawing Sheets

DELAY JITTER DISTRIBUTION BASED ON MIXED LAPLACE DISTRIBUTION

REMOTE MONITORING APPARATUS, REMOTE MONITORING METHOD, AND REMOTE MONITORING SYSTEM

This application is a National Stage Entry of PCT/JP2020/029434 filed on Jul. 31, 2020, the contents of all of which are incorporated herein by reference, in their entirety.

TECHNICAL FIELD

The present disclosure relates to a remote monitoring apparatus, a remote monitoring method, and a remote monitoring system.

BACKGROUND ART

In some cases, in a remote monitoring apparatus that is located in a remote place that is apart from a movement section where a mobile object, such as a vehicle, serving as a target to be monitored moves, a state of the mobile object is estimated. In these cases, the remote monitoring apparatus performs communication with the mobile object via a network, obtains information relating to the mobile object, and estimates the state of the mobile object on the basis of the obtained information.

However, in the network that performs communication with the mobile object, a variation in communication quality, such as delay jitter, occurs. The delay jitter serves as an indicator indicting the stability of a delay variation of communication.

Therefore, it is important to estimate a state of a mobile object with high accuracy even in an unstable communication environment. In view of this, recently, a technology for performing various types of processing in an unstable communication environment has been proposed.

For example, Patent Literature 1 discloses that event sensing time at which a sensor has sensed an object is estimated on the basis of a delay jitter amount calculated from a sampling period, and a system delay time that has been measured in advance, and that a position of the object is estimated.

CITATION LIST

Patent Literature

Patent Literature 1: International Patent Publication No. WO2017/154296

SUMMARY OF INVENTION

Technical Problem

However, in the network that performs communication with the mobile object, communication quality frequently varies depending on geographical characteristics. For example, delay jitter in the network varies depending on a position or a movement direction of the mobile object.

Therefore, in order to estimate a state of the mobile object with high accuracy, it is necessary to specify a delay jitter distribution that corresponds to the geographical characteristics in consideration of the position or the movement direction of the mobile object. The delay jitter distribution is expressed, for example, as a probability density function of delay jitter.

In view of this, it is an object of the present disclosure to solve the problem described above, and provide a remote monitoring apparatus, a remote monitoring method, and a remote monitoring system that are capable of specifying a delay jitter distribution that corresponds to geographical characteristics.

Solution to Problem

A remote monitoring apparatus in one aspect includes:
an observation unit configured to observe traffic in a network that corresponds to a movement section where a mobile object moves, the mobile object serving as a target to be monitored; and
a specification unit configured to divide the movement section on the basis of the traffic that has been observed, and specify a delay jitter distribution in each divided section.

A remote monitoring method in one aspect includes:
a first step of observing traffic in a network that corresponds to a movement section where a mobile object moves, the mobile object serving as a target to be monitored; and
a second step of dividing the movement section on the basis of the traffic that has been observed, and specifying a delay jitter distribution in each divided section.

A remote monitoring system in one aspect includes:
an observation unit configured to observe traffic in a network that corresponds to a movement section where a mobile object moves, the mobile object serving as a target to be monitored; and
a specification unit configured to divide the movement section on the basis of the traffic that has been observed, and specify a delay jitter distribution in each divided section.

Advantageous Effects of Invention

In the aspects described above, an effect by which a remote monitoring apparatus, a remote monitoring method, and a remote monitoring system that are capable of specifying a delay jitter distribution that corresponds to geographical characteristics can be provided can be exhibited.

EXAMPLE EMBODIMENT

<Problems of Present Disclosure>

Prior to the description of example embodiments according to the present disclosure, problems of the present disclosure are described in detail with reference to FIGS. 1 to 3.

Figure 1:
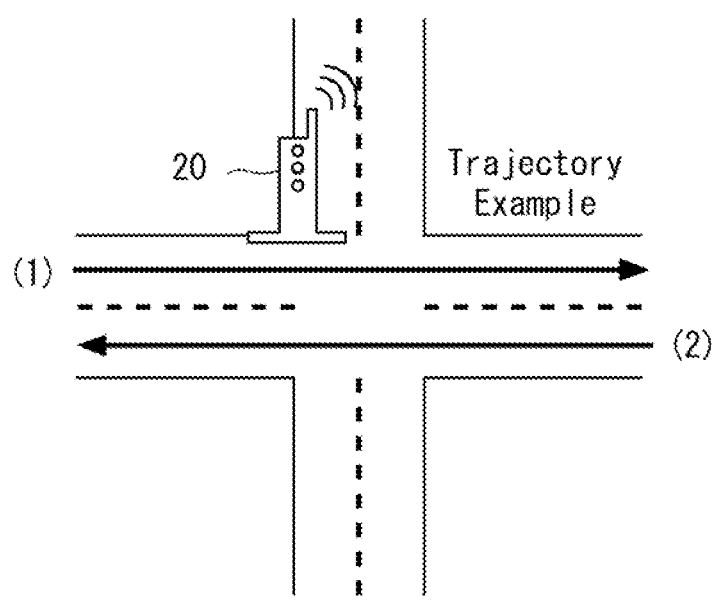
FIG. 1 is a diagram illustrating an example of a movement direction of a mobile object.

Here, the two cases described below are assumed, as illustrated in FIG. 1.

(A1) Case where a mobile object, such as a vehicle, transmits a packet at predetermined transmission intervals, while moving in movement direction (1)

(A2) Case where the mobile object transmits a packet at predetermined transmission intervals, while moving in movement direction (2) that is opposite to movement direction (1)

The mobile object causes a packet to include at least positional information indicating a position of the mobile object, and a packet number. The packet transmitted by the mobile object passes through a base station 20, and is received by a remote monitoring apparatus. The remote monitoring apparatus calculates delay jitter by using, for example, Formula 1 described below.

$$\text{Delay jitter} = \text{reception time of } i\text{-th packet} - \text{reception time of } (I-1)\text{th packet} \quad [\text{Formula 1}]$$

Figure 2:
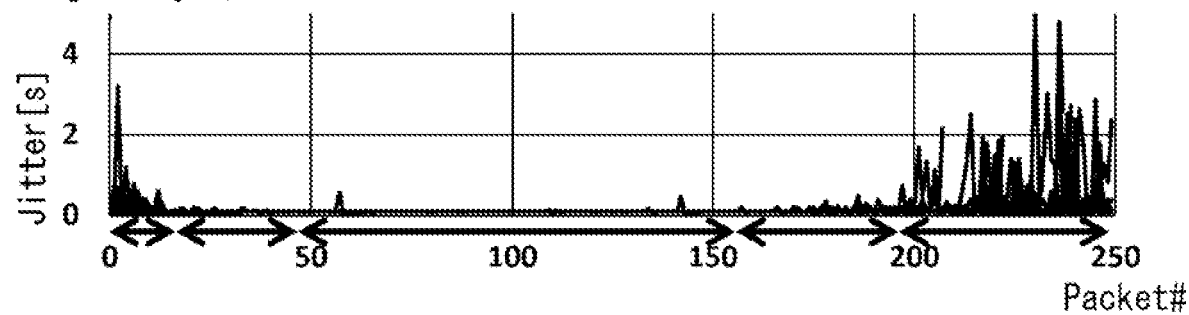
FIG. 2 is a diagram illustrating an example of delay jitter in a case where the mobile object has moved in movement direction (1) illustrated in FIG. 1.

FIG. 2 illustrates an example of delay jitter in case (A1) described above, and FIG. 3 illustrates an example of delay jitter in case (A2) described above. In FIGS. 2 and 3, a horizontal axis indicates a packet number, and a vertical axis indicates delay jitter of a packet having the packet number. In case (A1) described above, an initial value of the packet number is 0, and the packet number increases in every movement. In contrast, in case (A2) described above, an initial value of the packet number is 250, and the packet number decreases in every movement. Therefore, the packet numbers on the horizontal axes in FIGS. 2 and 3 indicate the same position of the mobile object.

Figure 3:
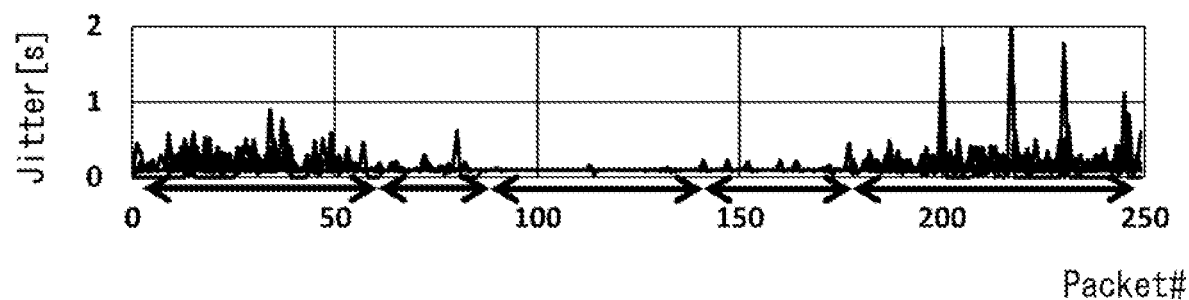
FIG. 3 is a diagram illustrating an example of delay jitter in a case where the mobile object has moved in movement direction (2) illustrated in FIG. 1.

As illustrated in FIGS. 2 and 3, it is apparent that delay jitter varies depending on a position of the mobile object.

Furthermore, in a comparison between FIGS. 2 and 3, it is apparent that even if the mobile object is located in the same position, delay jitter varies depending on a movement direction of the mobile object.

Therefore, in the remote monitoring apparatus, in order to specify a delay jitter distribution with high accuracy, it is necessary to learn a delay jitter distribution model that corresponds to geographical characteristics such as a position or a movement direction of the mobile object, and know that a certain type of delay jitter distribution is obtained in a certain section of a movement section where the mobile object moves.

However, if the movement section of the mobile object is divided into sections having a fixed size, the problem described below arises depending on size. For example, the case of a large fixed size causes a problem in which plural types of delay jitter distributions appear in the same section. Furthermore, the case of a small fixed size causes a problem in which the same type of delay jitter distribution is separated over a plurality of sections.

As described above, if the movement section of the mobile object is divided into sections having a fixed size, the problems described above result in a deterioration of the accuracy of specification of a delay jitter distribution. Therefore, the movement section of the mobile object needs to be appropriately divided.

Furthermore, the present disclosure has another problem.

It is known that the delay jitter distribution conforms to a Laplace distribution.

However, in a delay jitter distribution based on the Laplace distribution, a variation in delay jitter due to a variation in communication quality, such as the simultaneous arrival of packets or packet loss, is not considered.

Therefore, in order to specify a delay jitter distribution with high accuracy, a delay jitter distribution model in consideration of the simultaneous arrival of packets or packet loss also needs to be learned.

Respective example embodiments of the present disclosure that are described below contribute to solution to the problems described above.

Example embodiments of the present disclosure are described below with reference to the drawings. Note that in the description and drawings described below, omission and simplification are made as appropriate, for clarity of description. Furthermore, in each of the drawings described below, the same elements are denoted by the same reference signs, and a duplicate description is omitted as necessary. Moreover, in each of the example embodiments described below, description is provided under the assumption that a mobile object serving as a target to be monitored is a vehicle such as an automobile, but the mobile object is not limited to the vehicle.

First Example Embodiment

First, an example of the entire configuration of a remote monitoring system 1 according to the present first example embodiment is described with reference to FIG. 4.

Figure 4:
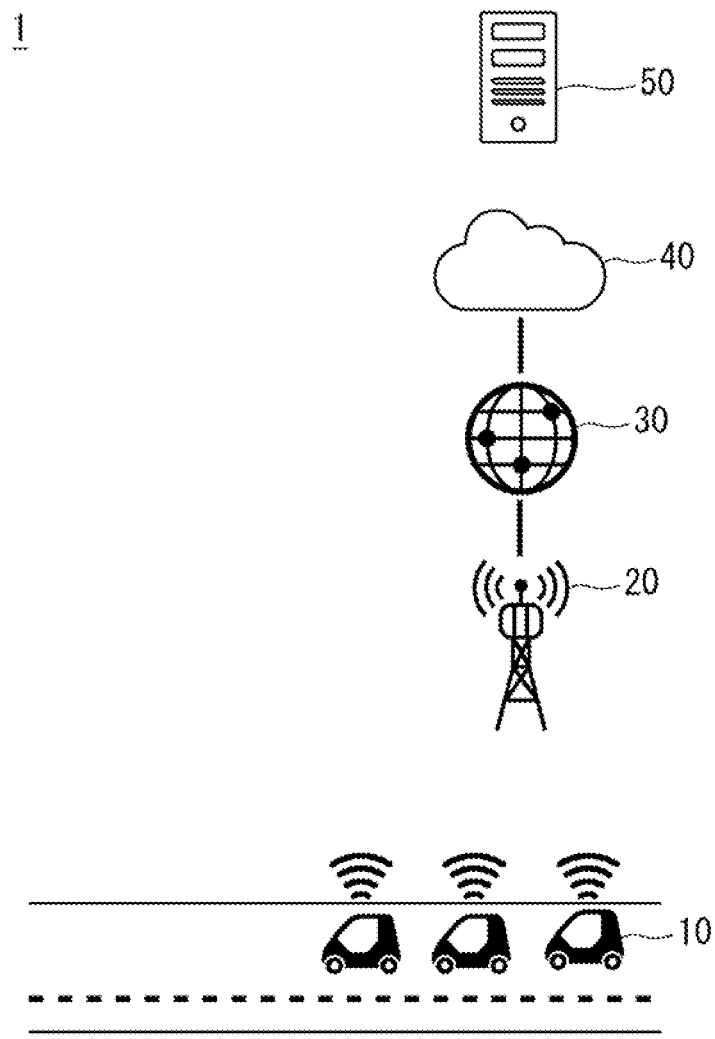
FIG. 4 is a diagram illustrating an example of the entire configuration of a remote monitoring system according to a first example embodiment.

As illustrated in FIG. 4, the remote monitoring system 1 according to the present first example embodiment includes a vehicle 10 and a remote monitoring apparatus 50.

The vehicle 10 is connected to a base station 20 through a wireless network. The wireless network is a network such as 3rd generation (3G), 4G/long term evolution (LTE), 5G, local 5G, or wireless fidelity (Wi-Fi).

The vehicle 10 is further connected through the base station 20 and the Internet 30 to the remote monitoring apparatus 50 that is disposed on a cloud 40. However, this is not restrictive, and an aspect may be employed where the vehicle is directly connected to a network on a side of the remote monitoring apparatus 50 through the wireless network without using the Internet 30.

Next, examples of configurations of the vehicle 10 and the remote monitoring apparatus 50 according to the present first example embodiment are described with reference to FIG. 5.

Figure 5:
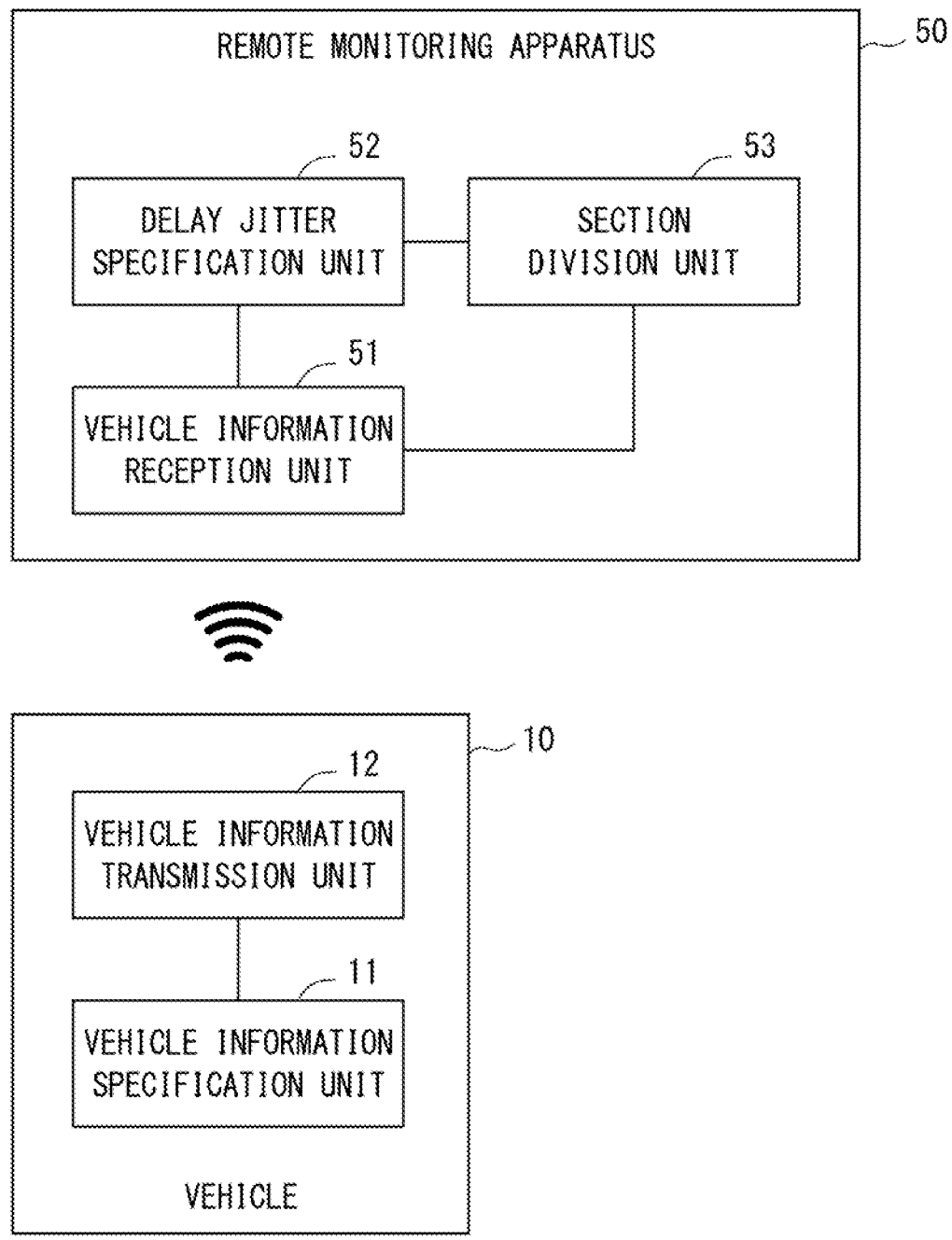
FIG. 5 is a block diagram illustrating examples of configurations of a vehicle and a remote monitoring apparatus according to the first example embodiment.

As illustrated in FIG. 5, the vehicle 10 according to the present first example embodiment includes a vehicle information specification unit 11 and a vehicle information transmission unit 12.

The vehicle information specification unit 11 specifies a state of the vehicle 10.

The vehicle information transmission unit 12 transmits, to the remote monitoring apparatus 50, a packet including at least vehicle information indicating the state of the vehicle 10 that has been specified by the vehicle information specification unit 11, and a packet number.

Note that in the present first example embodiment, it is assumed that the vehicle information specification unit 11 specifies at least a position of the vehicle 10, and the vehicle information includes at least a time stamp, and information relating to a position of the vehicle 10 at the time indicated by the time stamp. However, this is not restrictive, and the vehicle information may also include information indicating a state or the like of the speed of the vehicle 10, a steering wheel, or a residual amount of fuel.

The remote monitoring apparatus 50 according to the present first example embodiment includes a vehicle information reception unit 51, a delay jitter specification unit 52, and a section division unit 53.

The vehicle information reception unit 51 receives the packet including the vehicle information from the vehicle 10.

The delay jitter specification unit 52 calculates, for each position of the vehicle 10, delay jitter in a network that performs communication with the vehicle on the basis of the packet received from the vehicle 10, and the vehicle information included in the packet. In the example of FIG. 4, the network that performs communication with the vehicle 10 is a network that includes the wireless network between the vehicle 10 and the base station 20, the Internet 30, and the network on a side of the remote monitoring apparatus 50. The delay jitter specification unit 52 can calculate delay jitter by using, for example, Formula 1 described above.

The section division unit 53 learns a delay jitter distribution model in a movement section where the vehicle 10 moves, on the basis of the delay jitter for each of the positions of the vehicle 10 that has been calculated by the delay jitter specification unit 52. Moreover, the section division unit 53 divides the movement section of the vehicle 10 on the basis of the delay jitter for each of the positions of the vehicle 10 and the learned delay jitter distribution model, and specifies a delay jitter distribution in each of the divided sections. Note that the movement section of the vehicle 10 and the network that performs communication with the vehicle 10 correspond to each other.

Note that the remote monitoring apparatus 50 may be provided with a monitoring unit (not illustrated) that monitors a running situation of the vehicle 10. The monitoring unit may calculate the time to collision (TTC), which is a remaining time period before collision of the vehicle 10, on the basis of the vehicle information received from the vehicle 10, and may calculate a degree of risk of the vehicle 10 on the basis of the TTC. Furthermore, the monitoring unit may modify the TTC on the basis of delay jitter in a section where the vehicle 10 is moving, and may calculate the degree of risk on the basis of the modified TTC. For example, it is conceivable that the TTC is modified to be shorter in a section having large delay jitter.

Furthermore, the monitoring unit may control the vehicle 10 on the basis of a result of monitoring the vehicle 10. For example, in a case where the vehicle 10 has a high degree of risk, the monitoring unit may perform control, for example, to apply the sudden brakes or reduce traveling speed. Furthermore, if the vehicle 10 is an automated driving vehicle, the monitoring unit may perform switching from automated driving to remote driving.

An operation of the section division unit 53 according to the present first example embodiment is described in detail below.

(B1) Delay Jitter Distribution Model

First, a delay jitter distribution model to be used by the section division unit 53 is described with reference to FIGS. 6 and 7.

Figure 6:
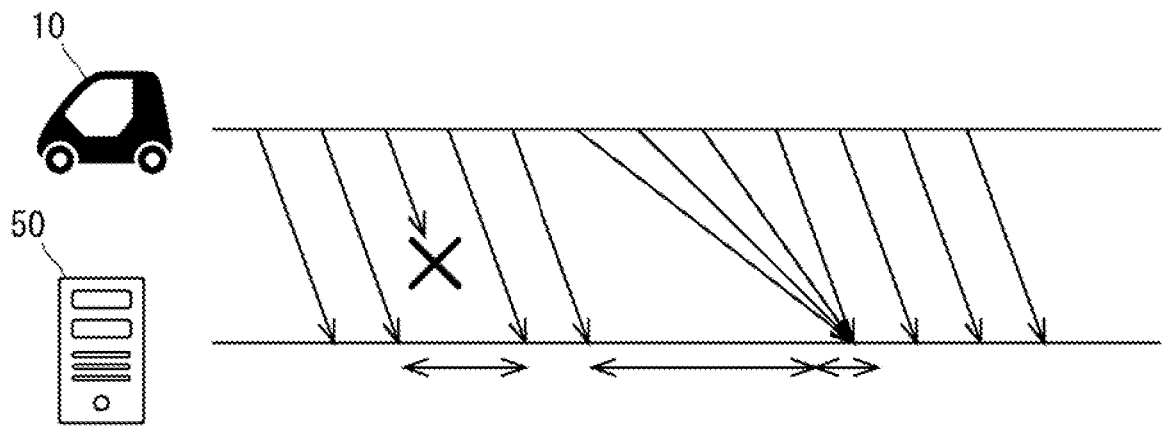
FIG. 6 is a diagram illustrating an example of a situation where the simultaneous arrival of packets and packet loss have occurred.

As illustrated in FIG. 6, the vehicle 10 transmits a packet at predetermined transmission intervals.

Therefore, in a case where communication quality is normal, the remote monitoring apparatus 50 receives the packet from the vehicle 10 at intervals that correspond to the predetermined transmission intervals.

However, in a case where the simultaneous arrival of packets or packet loss occurs, in the remote monitoring apparatus 50, an interval of reception of a packet from the vehicle 10 varies, and this results in a variation in delay jitter.

Figure 7:
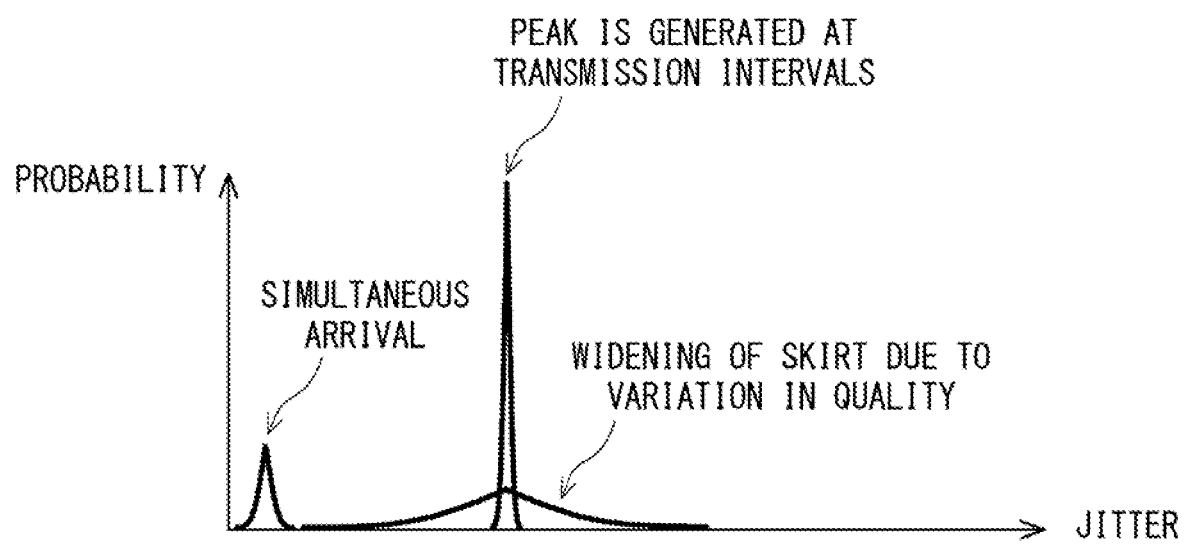
FIG. 7 is a diagram illustrating an example of a delay jitter distribution based on a Laplace distribution.

Furthermore, it is known that a delay jitter distribution conforms to a Laplace distribution, as illustrated in FIG. 7. In FIG. 7, a horizontal axis indicates delay jitter, and a vertical axis indicates a probability of the delay jitter.

In a case where communication quality is normal, the remote monitoring apparatus 50 receives a packet from the vehicle 10 at intervals that correspond to the predetermined transmission intervals. Therefore, in a delay jitter distribution, a peak is generated in a position that corresponds to a transmission interval of a packet.

However, in a case where the simultaneous arrival of packets or packet loss occurs, in the remote monitoring apparatus 50, an interval of reception of a packet from the vehicle 10 varies, and this results in a variation in delay jitter. Therefore, in the delay jitter distribution, a plurality of peaks is generated. Furthermore, in a case where communication quality drastically varies, the skirt of the delay jitter distribution is widened.

In view of this, the section division unit 53 according to the present first example embodiment employs a delay jitter distribution model based on a mixed Laplace distribution in which a plurality of Laplace distributions has been mixed, and specifies a delay jitter distribution in the movement section of the vehicle 10, by using this delay jitter distribution model based on the mixed Laplace distribution.

A delay jitter distribution model $f_\theta(y)$ according to the present first example embodiment is defined by using Formula 2 described below, for example, in the case of a mixed Laplace distribution in which g Laplace distributions have been mixed.

$$f_\theta(y) = \sum_{j=1}^{g} \xi_j f_j(y; \phi_j)$$ [Formula 2]

In this formula, $\theta$ is a model parameter, y is observation data indicating delay jitter for each position of the vehicle 10, $f_j(y; \phi_j)$ is a j-th Laplace distribution, and $\xi_j$ is a mixing ratio indicating a ratio observed from the j-th Laplace distribution.

Furthermore, the j-th Laplace distribution $f_j(y; \phi_j)$ is defined by using Formula 3 described below.

$$f_j(y; \phi_j) = \mathcal{L}(y \mid (\mu_j, \beta_j)) = \frac{1}{2\beta_j} \exp\left(-\frac{|y - \mu_j|}{\beta_j}\right)$$ [Formula 3]

In this formula, $\beta_j$ is a population parameter of a scale, and $\mu_j$ is a population parameter of a position.

Furthermore, various parameters in Formulae 2 and 3 described above are defined by using Formula 4 described below.

$$\Lambda = \{\xi_1, \ldots, \xi_{g-1}\}^T$$

$$\theta = \{\Lambda, \phi_1, \ldots, \phi_g\}^T$$

$$\phi_j = \{\mu_j, \beta_j\}$$

$$\xi_g = 1 - \xi_1 - \ldots - \xi_{g-1}$$ [Formula 4]

(B2) Section Division

Figure 8:
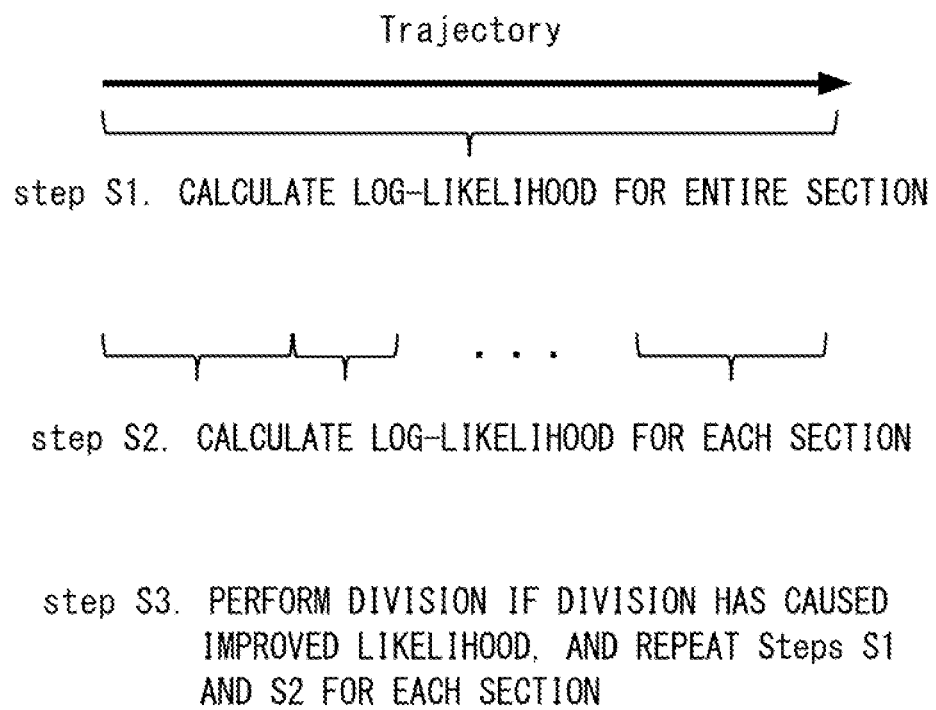
FIG. 8 is a diagram illustrating an example of an operation of a section division unit according to the first example embodiment.

Next, an operation for the section division unit 53 to divide the movement section of the vehicle 10 is described with reference to FIG. 8.

The section division unit 53 has a basic policy that the movement section of the vehicle 10 is divided in such a way that the delay jitter distribution specified by using the delay jitter distribution model based on the mixed Laplace distribution that has been described above can most appropriately express an actual delay jitter distribution.

Step S1:

The section division unit 53 obtains, from the delay jitter specification unit 52, observation data $y_i$ for the entire movement section in a movement direction of the vehicle 10, which is defined by Formula 5 described below.

$$y_i = \{y_1, \ldots, y_n\}^T$$ [Formula 5]

Then, the section division unit 53 learns a model parameter $\theta_i$ of the delay jitter distribution model, by using the observation data $y_i$.

Then, the section division unit 53 specifies a delay jitter distribution for the entire movement section of the vehicle 10, by using the delay jitter distribution model, the learned model parameter $\theta_i$, and the observation data $y_i$, and calculates the log-likelihood of the specified delay jitter distribution, which is defined by Formula 6 described below.

$$l(\theta_i, y_i) = \log f(y_i \mid \theta_i)$$ [Formula 6]

Step S2:

Next, the section division unit 53 calculates a mean and a variance of the observation data $y_i$ by using a movement window having a predetermined length, and divides the movement section of the vehicle 10 into N sections by using the k-means method or the like.

Then, the section division unit 53 specifies a delay jitter distribution for each of the divided sections by using the observation data in a corresponding section, similarly to step S1, and calculates the log-likelihood of the specified delay jitter distribution, which is defined by Formula 7 described below.

$$l(\theta_{iN}, y_{iN}) = \log f(y_{iN} \mid \theta_{iN})$$ [Formula 7]

Step S3:

Next, the section division unit 53 determines whether the total of log-likelihoods of respective sections after division that have been calculated in step S2 has been improved in comparison with the log-likelihood before division that has been calculated in step S1. In a case where the total has been improved, step S1 and step S2 are repeated, and further section division is performed.

Stated another way, the section division unit 53 repeats step S1 and step S2 while Formula 8 described below is satisfied.

$$l(\theta_i, y_i) < \sum_{k=1}^{N} l(\theta_{ik}, y_{ik})$$ [Formula 8]

The section division unit 53 terminates section division at a point in time when Formula 8 described above is not satisfied. Then, the section division unit 53 specifies respective sections before most recent section division as respective final sections. As described above, the section division unit 53 divides the movement section of the vehicle 10 in such a way that the total of log-likelihoods for respective sections after division increases.

Here, an example of a method for learning the model parameter $\theta_i$ of the delay jitter distribution model in step S1 described above is described.

The model parameter $\theta_i$ can be calculated by using, for example, the expectation maximization (EM) algorithm for the mixed Laplace distribution.

The EM algorithm for the mixed Laplace distribution can be calculated as described below.

E-step:

$$Q(\theta, \theta^{(k)}) \quad \text{[Formula 9]}$$

is calculated.

For this calculation, Formulae 10 and 11 described below are used.

$$z_{ij}^{(k)} = \frac{\xi_j^{(k)} f_j(y_i \mid \phi_j^{(k)})}{\sum_{j=1}^{g} \xi_j^{(k)} f_j(y_i \mid \phi_j^{(k)})} \quad \text{[Formula 10]}$$

$$Q(\theta, \theta^{(k)}) = E_{\theta^{(k)}}[l(\theta, X) \mid Y = y] = \sum_{i=1}^{n}\sum_{j=1}^{g} z_{ij}^{(k)} \log f_j(y_i \mid \phi_j) + \sum_{i=1}^{n}\sum_{j=1}^{g} z_{ij}^{(k)} \log \xi_j \quad \text{[Formula 11]}$$

M-step:

$$\frac{\partial}{\partial \theta} Q(\theta, \theta^{(k)}) = 0 \quad \text{[Formula 12]}$$

is calculated, and $$\theta^{(k+1)}, \quad \text{[Formula 14]}$$

which is a parameter that maximizes $$Q(\theta, \theta^{(k)}), \quad \text{[Formula 13]}$$

is calculated.

For this calculation, Formulae 15 to 17 described below are used.

$$\xi_j^{(k+1)} = \frac{1}{n}\sum_{i=1}^{n} z_{ij}^{(k)}; j = 1, \ldots, g-1 \quad \text{[Formula 15]}$$

$$\mu_j^{(k+1)} = \text{median}\left(y; j = \arg\max_j z_{ij}^{(k)}\right) \quad \text{[Formula 16]}$$

$$\beta_j^{(k+1)} = \text{average}\left(|y_i - \mu_j^{(k+1)}|; j = \arg\max_j z_{ij}^{(k)}\right) \quad \text{[Formula 17]}$$

Then, E-step and M-step described above are repeated until the likelihood becomes less than a threshold.

$$l(\theta^{(k+1)}, y) - l(\theta^{(k)}, y) > \epsilon_{min} \quad \text{[Formula 18]}$$

Next, an initial value of the EM algorithm is described.

$$z_{ij}^{(o)} \quad \text{[Formula 19]}$$

can be calculated by using Formulae 20 and 21 described below.

$$z_{i1}^{(o)} = 1 \text{ for } y_i < \tau_{min} \quad \text{[Formula 20]}$$

$$z_{ij}^{(o)} = 1 (j>1) \text{ for } \tau*j - \delta < y_i < \tau*(j+1) - \delta \quad \text{[Formula 21]}$$

In these formulae, $\tau$ is a transmission interval, $\tau_{min}$ is a lower limit value of the transmission interval (a minimum value of the observed delay jitter is set), and $\delta$ is a constant (for example, a value of ½ the transmission interval).

$$\mu_j^{(o)} \quad \text{[Formula 22]}$$

is the same as $$\mu_j^{(k+1)} \quad \text{[Formula 23]}$$

$$\beta_j^{(o)} \quad \text{[Formula 24]}$$

is the same as $$\beta_j^{(k+1)} \quad \text{[Formula 25]}$$

$$\xi_j^{(o)} \quad \text{[Formula 26]}$$

is the same as $$\xi_j^{(k+1)} \quad \text{[Formula 27]}$$

in a case where a loss rate is unknown in advance.

In a case where it is known in advance that the loss rate is p (for example, in a case where a loss rate of p can be calculated on the basis of a sequence number or the like), a probability that loss will not occur can be calculated by using Formula 28 described below.

$$p_{non-loss} = 1 - (\rho + \rho^2 + \ldots + \rho^n) = \frac{\rho - \rho^n}{1 - \rho} \to \frac{\rho}{1-\rho} (n \to \infty) \quad \text{[Formula 28]}$$

Accordingly, an occurrence probability of a Laplace distribution at a time when j≥2 can be calculated by using Formula 29 described below with c as a standardization constant.

$$\xi_j = \begin{cases} c\dfrac{\rho}{1-\rho}; j = 2 \\ c\rho^{j-2}; j > 2 \end{cases} \quad \text{[Formula 29]}$$

A Laplace distribution at a time when j=1 (a delay jitter distribution at a time when the simultaneous arrival of packets has occurred) is generated when delay jitter is two times or more the transmission interval, and therefore the Laplace distribution is expressed by using Formula 30 described below.

$$\xi_1 = \sum_{j=2}^{g} \int_{\mu_j + \tau}^{\infty} f_j(y; \phi_j) dy \quad \text{[Formula 30]}$$

Furthermore, the standardization constant is expressed by using Formula 31 described below.

$$c = \frac{(1 - \xi_1)}{g - 1} \quad \text{[Formula 31]}$$

(C1) Usefulness of Delay Jitter Distribution Model Based on Mixed Laplace Distribution Next, a verification result of verifying the usefulness of a delay jitter distribution model based on the mixed Laplace distribution that has been described above in (B1) is described with reference to FIGS. 9 to 13.

Figure 9:
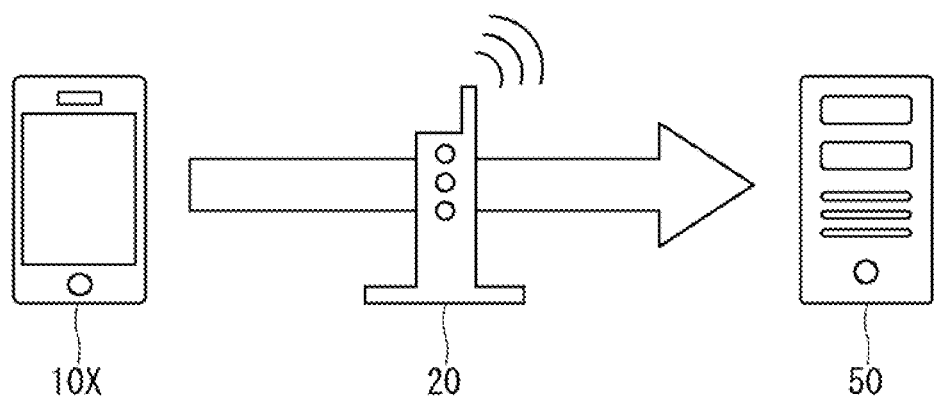
FIG. 9 is a diagram illustrating assumption for verifying the usefulness of a delay jitter distribution model based on a mixed Laplace distribution according to the first example embodiment.

Here, as illustrated in FIG. 9, the assumption is made that a mobile object 10X for which a position has been fixed transmits a 500-byte packet to the remote monitoring apparatus 50 through the base station 20 at transmission intervals of 10 ms. Here, the mobile object 10X causes the packet to include at least a packet number.

Figure 10:
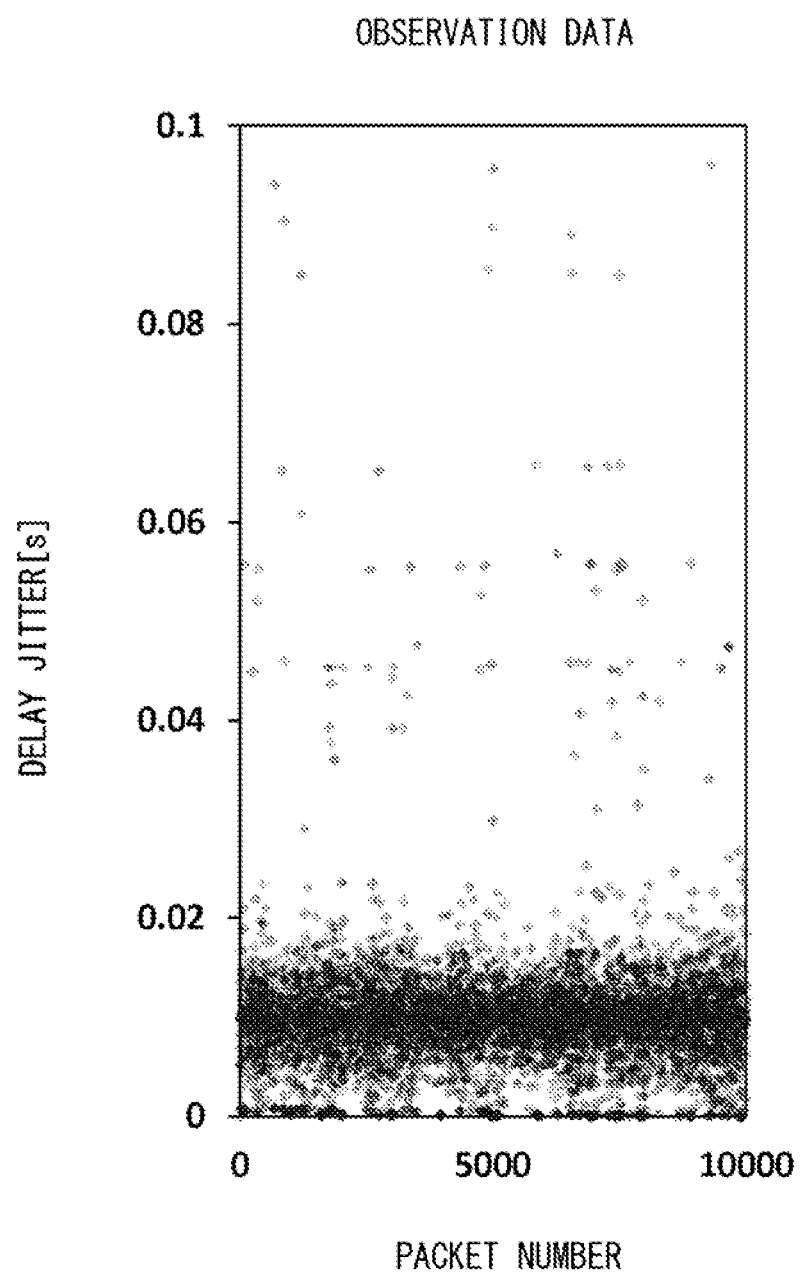
FIG. 10 is a diagram illustrating an example of delay jitter under the assumption illustrated in FIG. 9.

FIG. 10 illustrates observation data serving as delay jitter that has been calculated by the delay jitter specification unit 52 of the remote monitoring apparatus 50 under the assumption illustrated in FIG. 9. A horizontal axis and a vertical axis in FIG. 10 are similar to the horizontal axis and the vertical axis in FIGS. 2 and 3. However, in FIG. 9, the position of the mobile object 10X has been fixed, and therefore positions of the mobile object 10X are the same as each other, even if packet numbers are different from each other.

Figure 11:
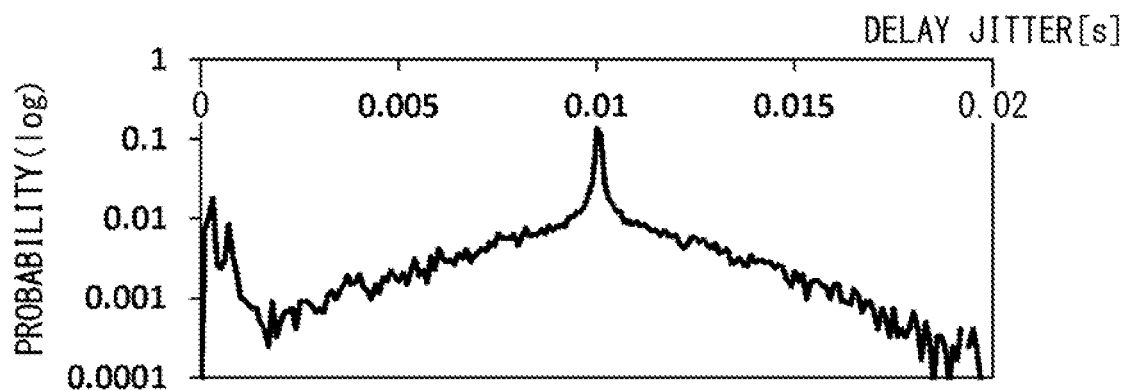
FIG. 11 is a diagram illustrating an example of a delay jitter distribution that has been calculated on the basis of the delay jitter illustrated in FIG. 10.
Figure 12:
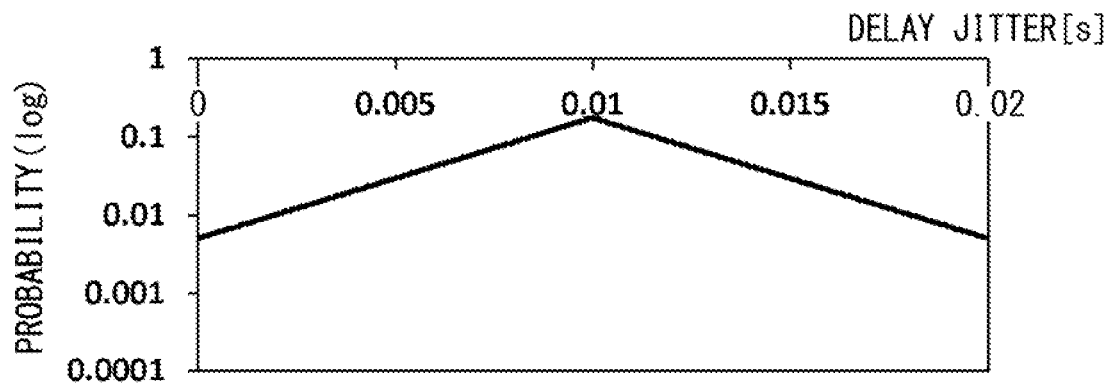
FIG. 12 is a diagram illustrating an example of a delay jitter distribution that has been specified by using a delay jitter distribution model based on the Laplace distribution.
Figure 13:
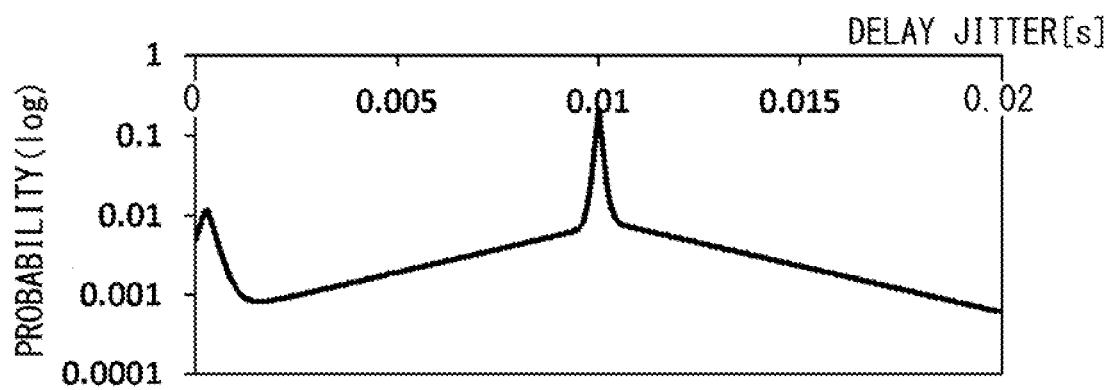
FIG. 13 is a diagram illustrating an example of a delay jitter distribution that has been specified by using the delay jitter distribution model based on the mixed Laplace distribution according to the first example embodiment.

FIG. 11 illustrates a delay jitter distribution that has been calculated on the basis of the delay jitter illustrated in FIG. 10. FIG. 12 illustrates a delay jitter distribution that has been specified by using a delay jitter distribution model based on the Laplace distribution. FIG. 13 illustrates a delay jitter distribution that has been specified by using the delay jitter distribution model based on the mixed Laplace distribution according to the present first example embodiment. A horizontal axis and a vertical axis in FIGS. 11 to 13 are similar to the horizontal axis and the vertical axis in FIG. 7.

As illustrated in FIG. 11, in an actually calculated delay jitter distribution, a plurality of peaks that has been caused by the simultaneous arrival of packets, or the like or the widening of a skirt that has been caused by a variation in communication quality is observed.

In contrast, as illustrated in FIG. 12, the delay jitter distribution that has been specified by using the delay jitter distribution model based on the Laplace distribution is a distribution having a stretched skirt, and it is apparent that a plurality of peaks or the like that has been caused by the simultaneous arrival of packets, or the like fails to be expressed.

On the other hand, as illustrated in FIG. 13, it is apparent that the delay jitter distribution that has been specified by using the delay jitter distribution model based on the mixed Laplace distribution according to the present first example embodiment can appropriately express a plurality of peaks that has been caused by the simultaneous arrival of packets, or the like or the widening of a skirt that has been caused by a variation in communication quality.

Therefore, it is apparent that the delay jitter distribution model based on the mixed Laplace distribution according to the present first example embodiment has been able to learn a delay jitter distribution in consideration of the simultaneous arrival of packets or packet loss, with high accuracy.

(C2) Usefulness of Section Division Based on Likelihood

Next, a verification result of verifying the usefulness of section division based on likelihood that has been described above in (B2) is described with reference to FIGS. 14 to 20. Usefulness in this case is determined on the basis of whether the delay jitter distribution model based on the mixed Laplace distribution according to the present first example embodiment has been able to learn a delay jitter distribution for each of the divided sections, with high accuracy.

Figure 14:
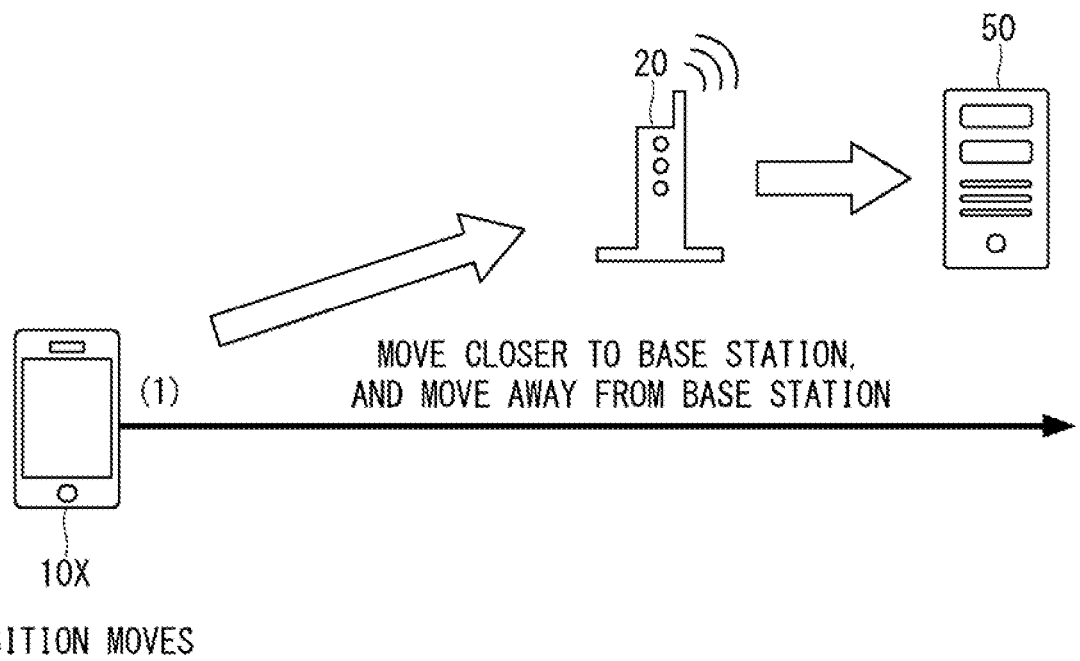
FIG. 14 is a diagram illustrating assumption for verifying the usefulness of section division based on likelihood according to the first example embodiment.

Here, as illustrated in FIG. 14, the assumption is made that the mobile object 10X is carried, for example, by a user, and transmits a 500-byte packet to the remote monitoring apparatus 50 through the base station 20 at transmission intervals of 10 ms, while moving in movement direction (1) (in a direction toward the base station 20 and in a direction away from the base station 20). Here, the mobile object 10X causes the packet to include, at least, positional information indicating a position of the mobile object 10X, and a packet number.

Figure 15:
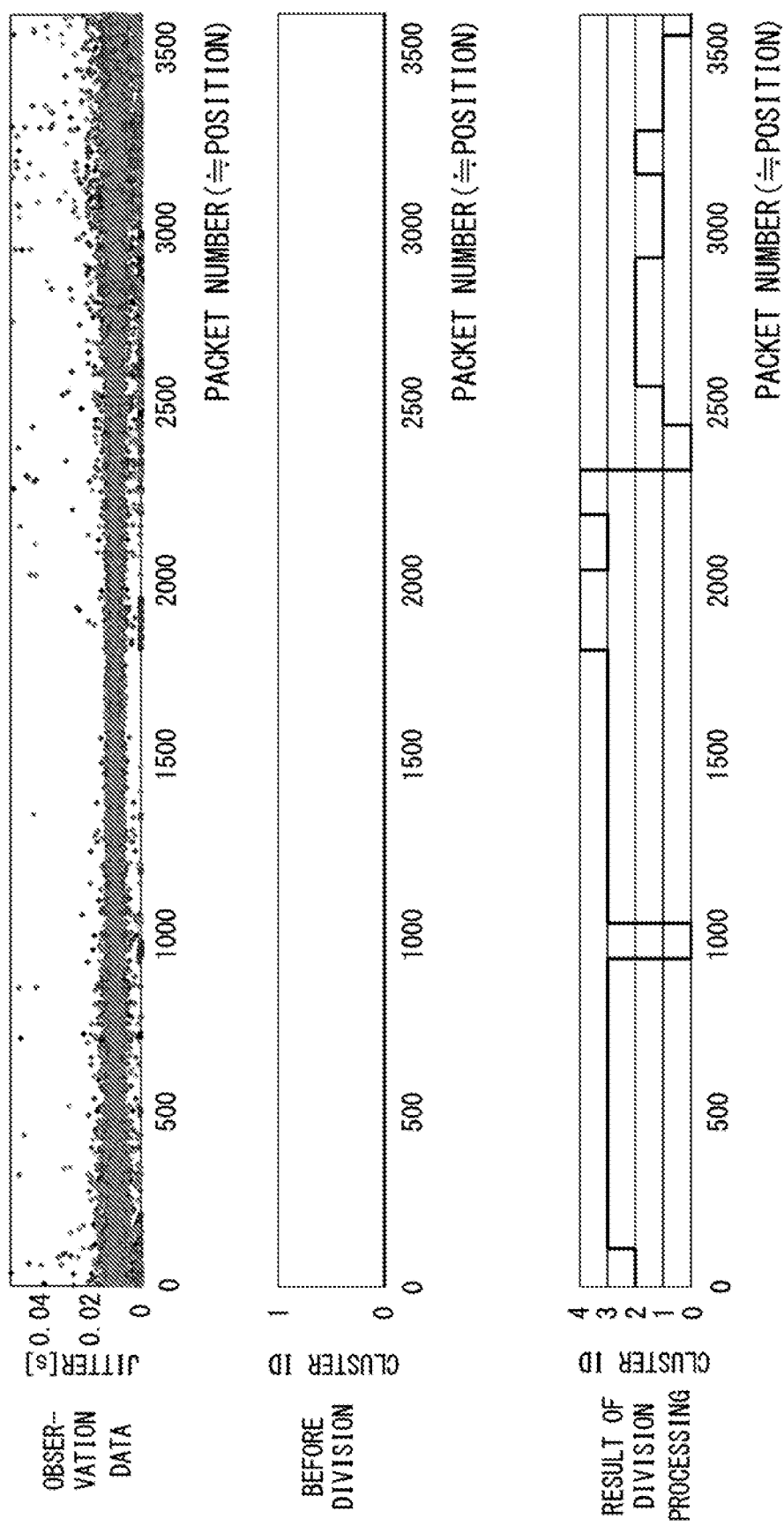
FIG. 15 is a diagram illustrating an example of a result of performing section division on a movement section of a mobile object on the basis of delay jitter under the assumption illustrated in FIG. 14.

FIG. 15 is a diagram illustrating a result of performing section division on a movement section of the mobile object 10X on the basis of delay jitter under the assumption illustrated in FIG. 14.

An upper diagram of FIG. 15 illustrates observation data serving as delay jitter for each position of the mobile object 10X that has been calculated by the delay jitter specification unit 52 of the remote monitoring apparatus 50 under the assumption illustrated in FIG. 14. A horizontal axis and a vertical axis in FIG. 15 are similar to the horizontal axis and the vertical axis in FIGS. 2 and 3. In FIG. 14, the mobile object 10X transmits the packet while moving. Therefore, in the upper diagram of FIG. 15, a packet number on the horizontal axis corresponds to a position of the mobile object 10X.

A middle diagram and a lower diagram of FIG. 15 illustrate that a mixed Laplace distribution of which cluster ID expresses a delay jitter distribution for which section in the movement section of the mobile object 10X, the middle diagram of FIG. 15 illustrates a state before section division, and the lower diagram of FIG. 15 illustrates a state after section division. In the middle diagram and the lower diagram of FIG. 15, a horizontal axis indicates a packet number, and a vertical axis indicates a cluster ID of a mixed Laplace distribution expressing a delay jitter distribution for a section including a position where a packet having the packet number has been transmitted.

A log-likelihood before section division was $-4.753 \times 10^4$, whereas a log-likelihood after section division has been improved to $-4.431 \times 10^4$. In this case, a log-likelihood that is closer to 0 indicates further improvements.

As illustrated in the middle diagram of FIG. 15, before section division, a delay jitter distribution for the entirety of the movement section is expressed by a single mixed Laplace distribution of cluster ID 0.

In contrast, as illustrated in the lower diagram of FIG. 15, after section division, a delay jitter distribution for each of the divided sections is expressed by any of five mixed Laplace distributions of clusters ID 0 to ID 4. For example, a delay jitter distribution for a section including a position where a packet having packet number 0 has been transmitted is expressed by a mixed Laplace distribution of cluster ID 2. Furthermore, a delay jitter distribution for a section including a position where a packet having packet number 3500 has been transmitted is expressed by a mixed Laplace distribution of cluster ID 0.

FIGS. 16 to 20 respectively illustrate mixed Laplace distributions of clusters ID 0 to ID 4. A horizontal axis and a vertical axis in FIGS. 16 to 20 are similar to the horizontal axis and the vertical axis in FIG. 7.

Figure 16:
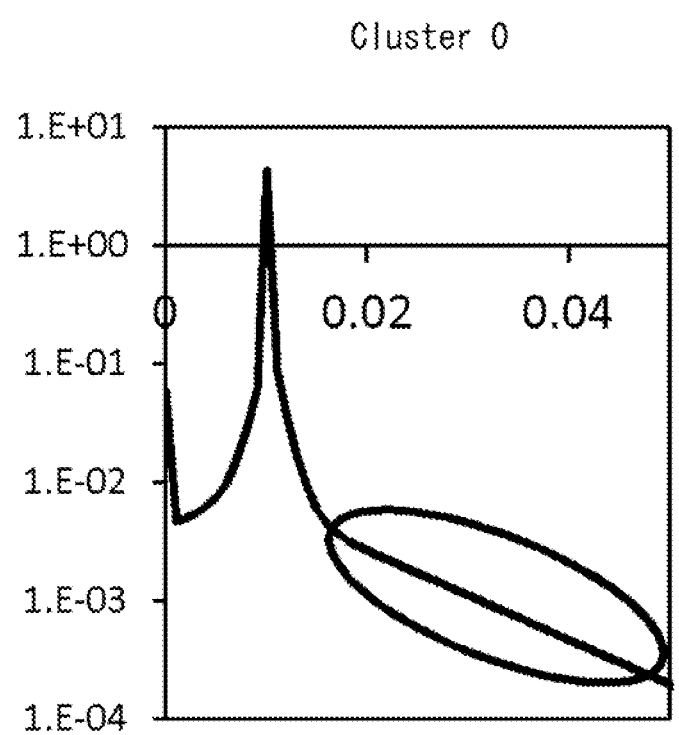
FIG. 16 is a diagram illustrating an example of a mixed Laplace distribution of cluster ID 0.
Figure 17:
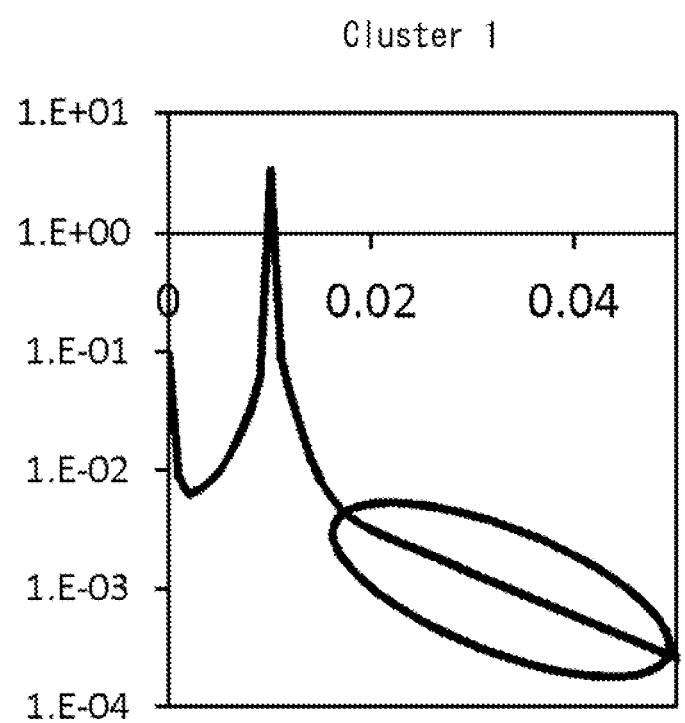
FIG. 17 is a diagram illustrating an example of a mixed Laplace distribution of cluster ID 1.

As illustrated in FIGS. 16 and 17, mixed Laplace distributions of clusters ID 0 and ID 1 are distributions having a widened skirt.

Figure 18:
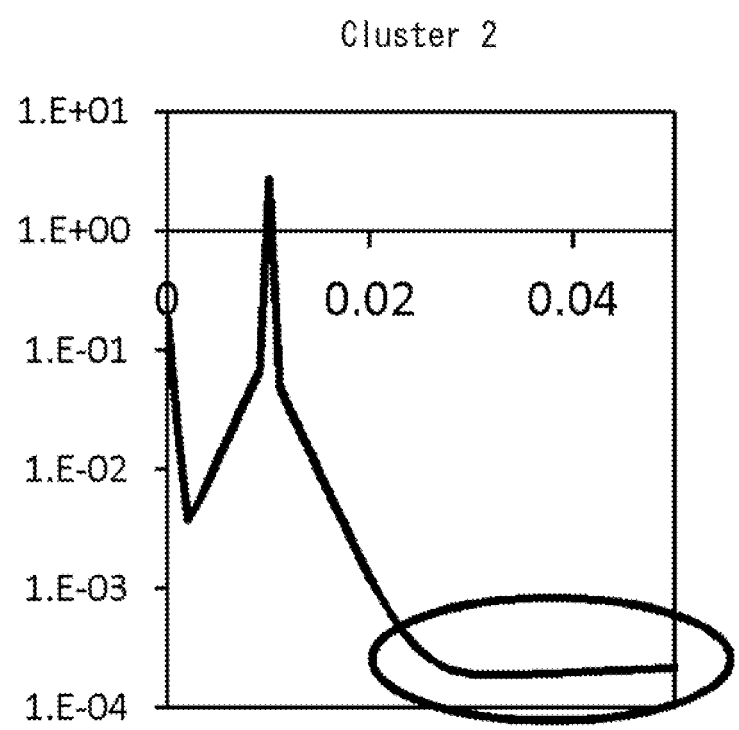
FIG. 18 is a diagram illustrating an example of a mixed Laplace distribution of cluster ID 2.

As illustrated in FIG. 18, a mixed Laplace distribution of cluster ID 2 is a distribution expressing a steep increase in delay jitter.

Figure 19:
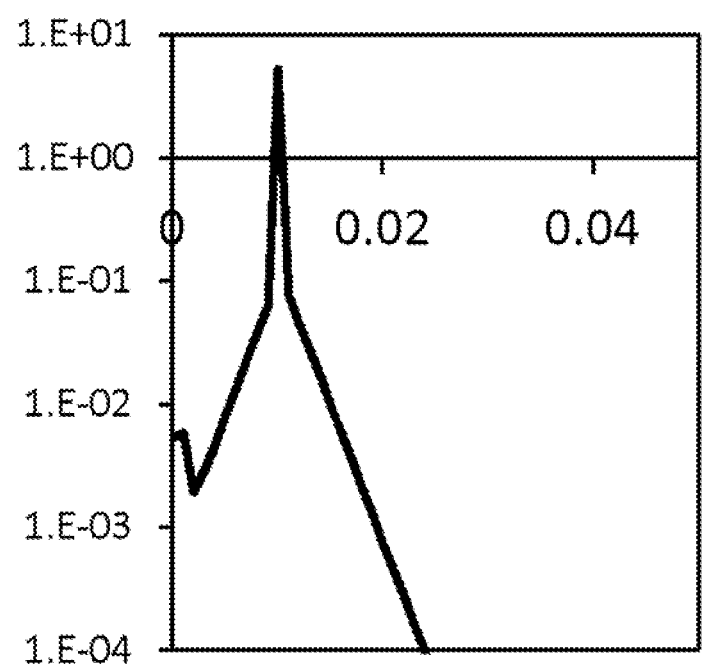
FIG. 19 is a diagram illustrating an example of a mixed Laplace distribution of cluster ID 3.
Figure 20:
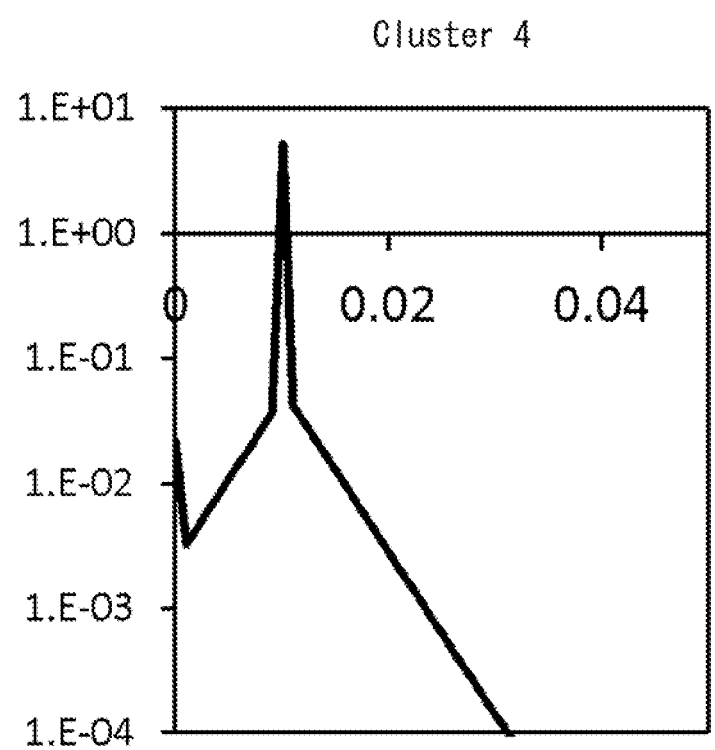
FIG. 20 is a diagram illustrating an example of a mixed Laplace distribution of cluster ID 4.

As illustrated in FIGS. 19 and 20, mixed Laplace distributions of clusters ID 3 and ID 4 are distributions expressing a small variation in delay jitter.

Here, with reference to the upper diagram of FIG. 15, a variation in delay jitter is small, for example, near a section where packets having packet numbers 1000 to 2000 have been transmitted. A delay jitter distribution of a section near this section is expressed by a mixed Laplace distribution of any of clusters ID 3 and ID 4, which expresses a small variation in delay jitter.

Furthermore, a variation in delay jitter is great near a section where packets having packet numbers 3000 to 3500 have been transmitted. A delay jitter distribution of a section near this section is expressed by any of mixed Laplace distributions of clusters ID 0 and ID 1, which have a widened skirt, and a mixed Laplace distribution of cluster ID 2, which expresses a steep increase in delay jitter.

Therefore, it is apparent that the delay jitter distribution model based on the mixed Laplace distribution according to the present first example embodiment has been able to learn a delay jitter distribution that is adapted to geographical characteristics such as a position or a movement direction of a mobile object, and grasps features of each of the divided sections, with high accuracy.

Next, an example of a flow of an operation of the remote monitoring apparatus 50 according to the first example embodiment is described with reference to FIG. 21.

Figure 21:
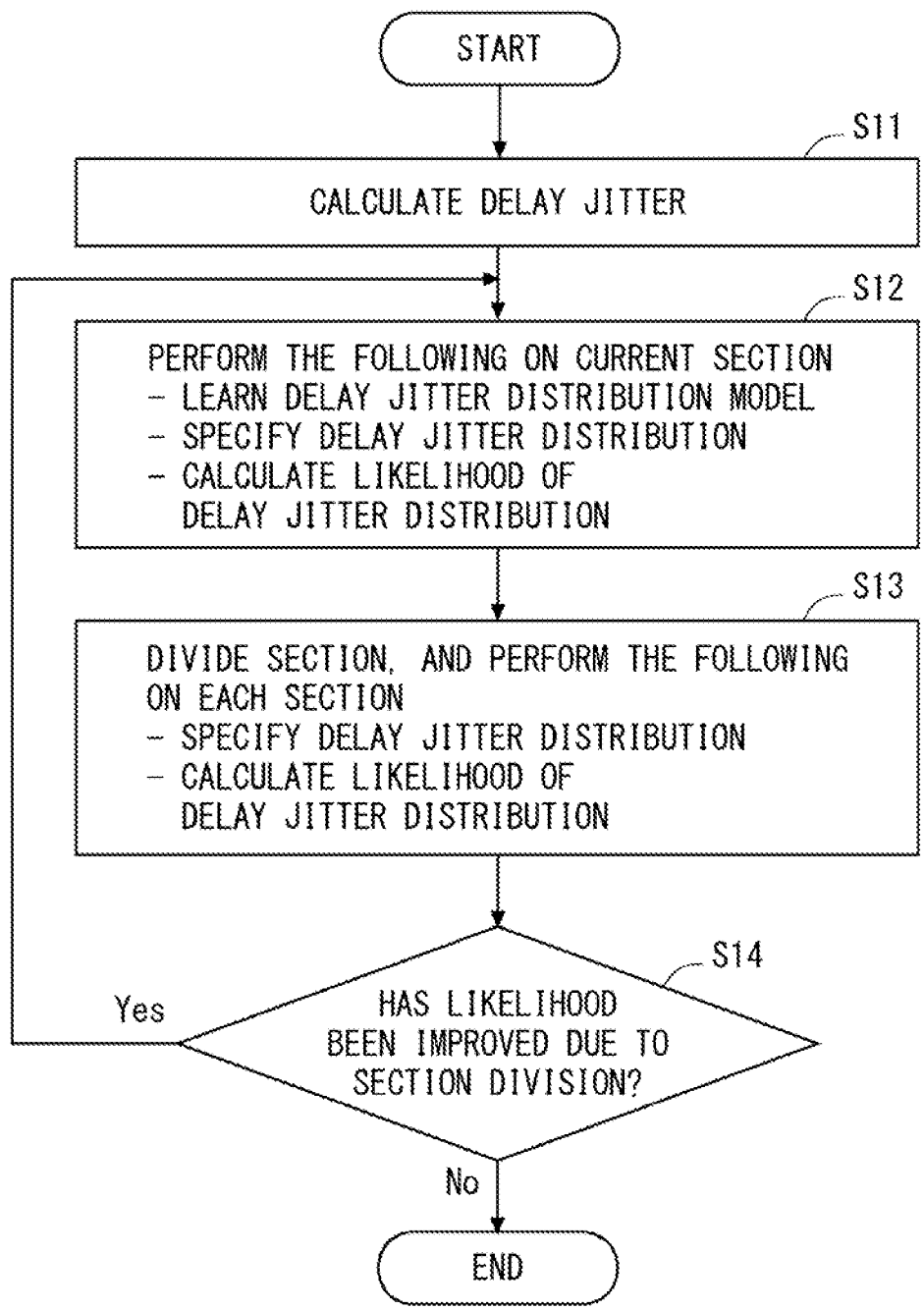
FIG. 21 is a flowchart illustrating an example of a flow of an operation of the remote monitoring apparatus according to the first example embodiment.

As illustrated in FIG. 21, first, the delay jitter specification unit 52 calculates delay jitter for each position of the vehicle 10 in the entire movement section of the vehicle 10 that corresponds to a network that performs communication with the vehicle 10 (step S11).

Next, the section division unit 53 learns a delay jitter distribution model for a current section (in step S12 of the first time, the entire movement section of the vehicle 10) on the basis of delay jitter in the current section that has been calculated in step S11. Moreover, the section division unit 53 specifies a delay jitter distribution for the current section on the basis of the delay jitter for the current section and the learned delay jitter distribution model, and calculates the likelihood of the specified delay jitter distribution (step S12).

Next, the section division unit 53 divides the current section. Then, the section division unit 53 specifies a delay jitter distribution for each of the divided sections on the basis of the delay jitter for a corresponding section and the learned delay jitter distribution model, and calculates the likelihood of the specified delay jitter distribution (step S13).

Next, the section division unit 53 determines whether the total of likelihoods for respective divided sections of the current section that have been calculated in step S13 has been improved in comparison with the likelihood for the current section that has been calculated in step S12 (step S14).

In a case where the likelihood has been improved in step S14 (Yes in step S14), the processing returns to step S12, and the section division unit 53 performs the processes of steps S12 and S13 for each of the divided sections obtained in step S13, by using each of the divided sections as a current section.

In contrast, in a case where the likelihood has not been improved in step S14 (No in step S14), the section division unit 53 terminates the processing. As a result, the section division unit 53 specifies respective sections before section division in step S13 of the most recent time as respective final sections.

As described above, according to the present first example embodiment, the delay jitter specification unit 52 calculates delay jitter in a network that performs communication with the vehicle 10. The section division unit 53 divides a movement section that corresponds to the network and where the vehicle moves, on the basis of the calculated delay jitter, and specifies a delay jitter distribution in each of the divided sections. As described above, the movement section of the vehicle 10 is divided, and a delay jitter distribution in each of the divided sections is specified. Therefore, a delay jitter distribution that corresponds to geographical characteristics such as a position or a movement direction of the vehicle 10 can be specified.

Furthermore, according to the present first example embodiment, the section division unit 53 specifies a delay jitter distribution by using a delay jitter distribution model based on a mixed Laplace distribution. This delay jitter distribution model can learn a delay jitter distribution in consideration of the simultaneous arrival of packets or packet loss, with high accuracy. Therefore, the delay jitter distribution in consideration of the simultaneous arrival of packets or packet loss can be specified.

Furthermore, according to the present first example embodiment, the section division unit 53 divides the movement section of the vehicle 10 in such a way that the likelihood of the mixed Laplace distribution increases. Therefore, the movement section of the vehicle 10 can be divided in such a way that a delay jitter distribution is adapted to geographical characteristics such as a position or a movement direction of the vehicle 10, grasps features in each of the divided sections, and has high accuracy.

Second Example Embodiment

A remote monitoring system 1A according to the present second example embodiment has a different configuration of the remote monitoring apparatus 50 in comparison with the first example embodiment described above.

Accordingly, an example of a configuration of the remote monitoring apparatus 50 according to the present second example embodiment is described below with reference to FIG. 22.

Figure 22:
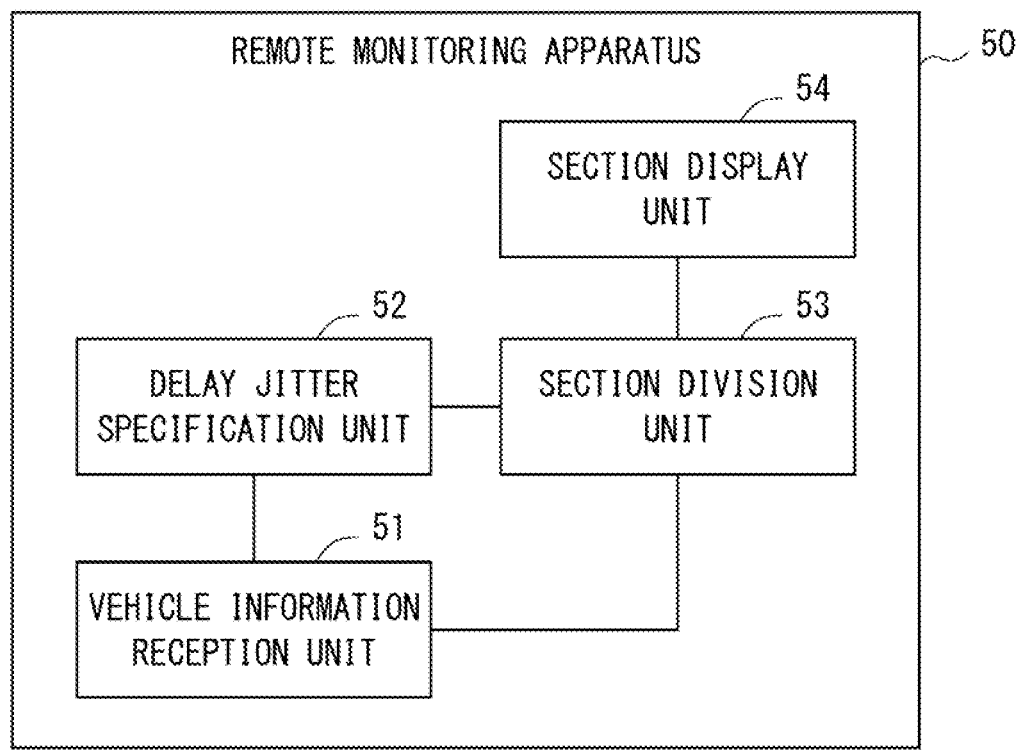
FIG. 22 is a block diagram illustrating examples of configurations of a vehicle and a remote monitoring apparatus according to a second example embodiment.
Figure 22:
Figure 22:
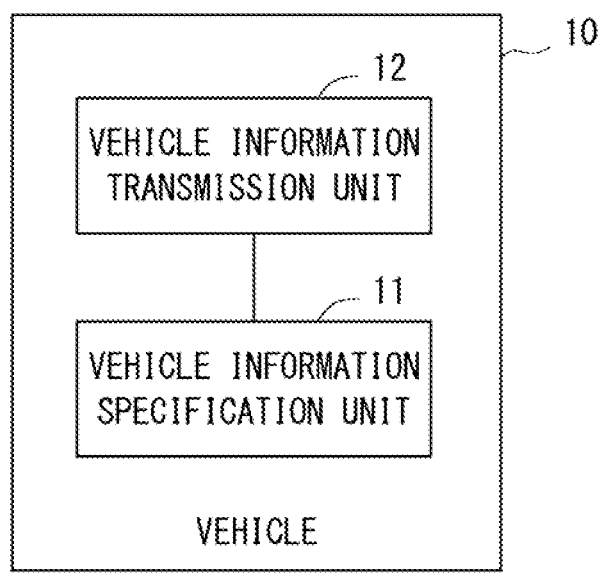

As illustrated in FIG. 22, the remote monitoring apparatus 50 according to the present second example embodiment is different in that a section display unit 54 is added, in comparison with the configuration of FIG. 5 according to the first example embodiment described above.

The section display unit 54 displays divided sections obtained by the section division unit 53 on a map indicating a movement section of the vehicle 10.

Figure 23:
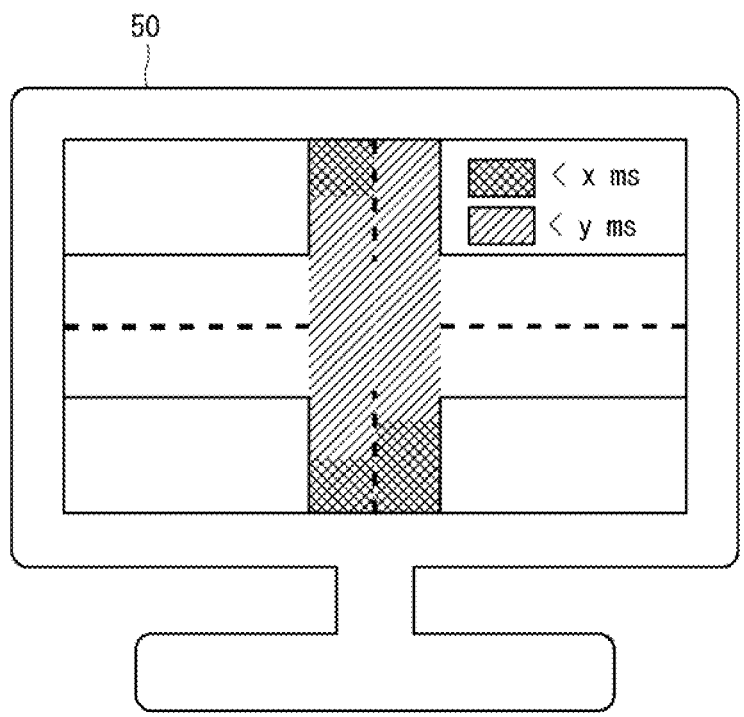
FIG. 23 is a diagram illustrating an example of a display of divided sections that has been conducted by a section display unit according to the second example embodiment.

An example of a display of each of the divided sections that has been conducted by the section display unit 54 is illustrated in FIG. 23. In the example of FIG. 23, the section display unit 54 classifies respective sections on the road by using patterns, and adds delay jitter in each of the sections.

However, the example of the display illustrated in FIG. 23 is not restrictive. For example, the section display unit 54 may classify the respective sections on the road by using color. Furthermore, the section display unit 54 may display a mark indicating a warning in a section having large delay jitter. The section display unit 54 may also classify the respective sections by using gradual color-coding, depending on delay jitter or a delay jitter distribution. The section display unit 54 may also display a list of names or coordinates of the respective sections. Furthermore, if any of the sections has been designated by clicking or the like, the section display unit 54 may display detailed information relating to the designated section.

Figure 24:
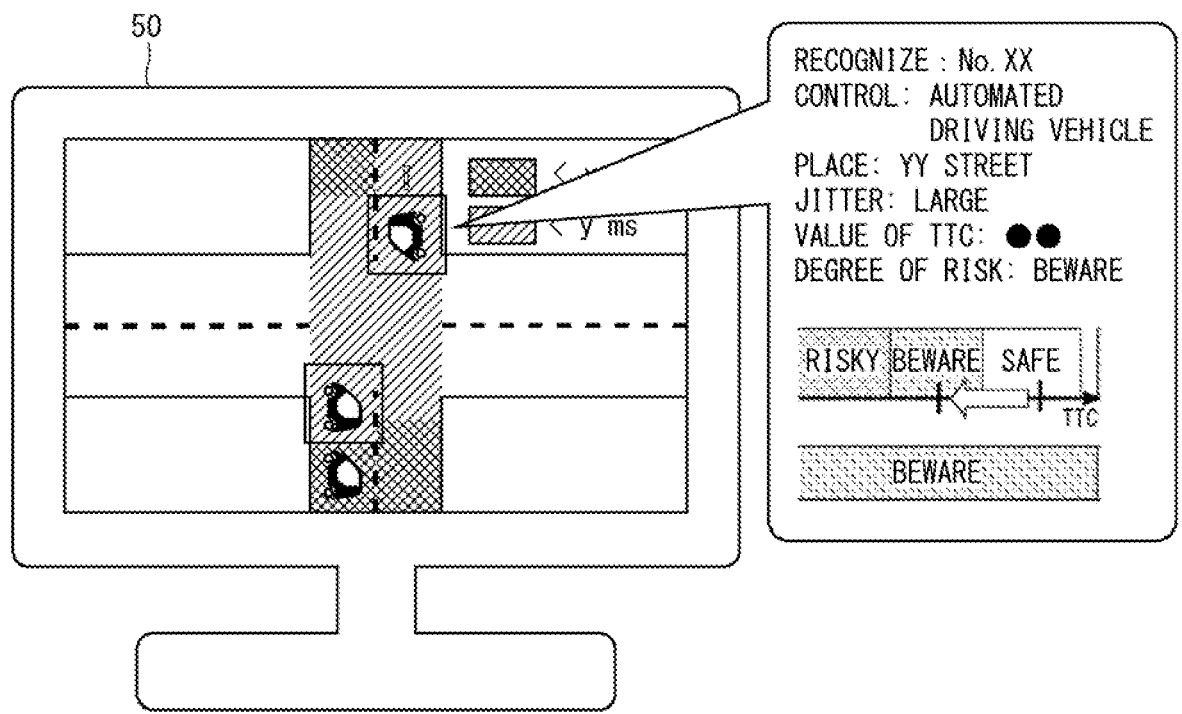
FIG. 24 is a diagram illustrating an example of a display of divided sections that has been conducted by the section display unit according to the second example embodiment.
Figure 25:
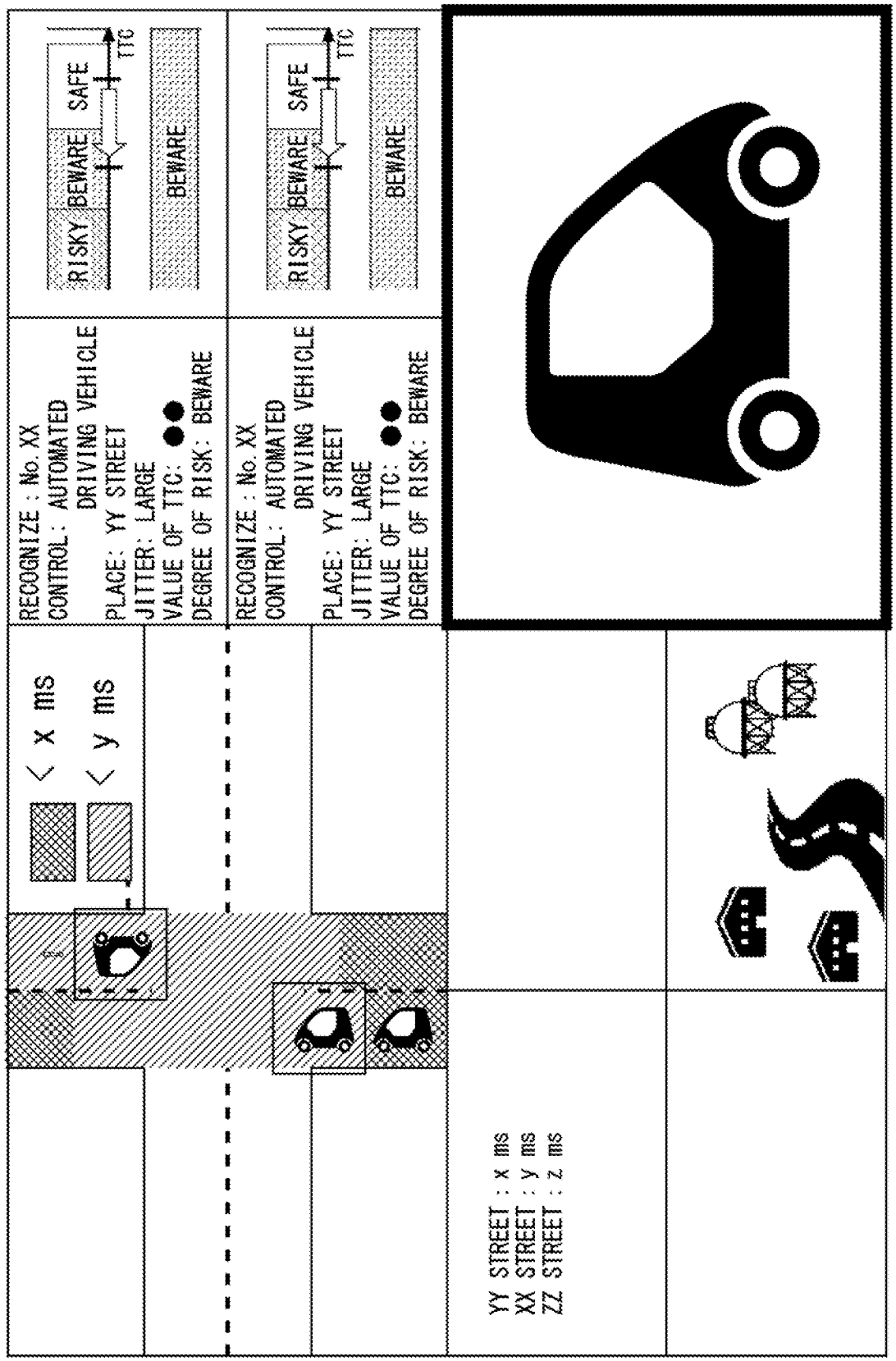
FIG. 25 is a diagram illustrating an example of a display of divided sections that has been conducted by the section display unit according to the second example embodiment.

Furthermore, in the examples of the display of FIGS. 23 to 25, the section display unit 54 displays each of the divided sections on a screen of the remote monitoring apparatus 50, but this is not restrictive. The section display unit 54 may display each of the divided sections in an arbitrary display device other than the remote monitoring apparatus 50 (for example, a display device of a monitoring center that monitors the road).

Furthermore, the monitoring unit described above (not illustrated) may simultaneously monitor a plurality of vehicles 10. As an example of a display of each of the divided sections that is conducted by the section display unit 54, an example of a display in a case where a plurality of vehicles 10 is simultaneously monitored is illustrated in FIG. 24. In the example of the display of FIG. 24, the section display unit 54 displays a plurality of vehicles 10. Then, if any of the vehicles 10 has been designated by clicking or the like, the section display unit 54 displays detailed information relating to the designated vehicle 10. FIG. 24 illustrates an example where the detailed information of the vehicle 10 is displayed in a balloon to be superimposed onto a monitoring screen, but a display method is not limited to this.

As another example of a display of each of the divided sections that is conducted by the section display unit 54, an example of a display in a case where a degree of risk of the vehicle 10 is monitored is illustrated in FIG. 25. In the example of the display of FIG. 25, the section display unit 54 displays a screen for monitoring in an upper left-hand side portion of FIG. 25, but detailed information relating to the vehicle 10 may be displayed in a superimposed manner. Furthermore, the section display unit 54 may display a video of a monitoring camera that takes a picture of the vehicle 10 or a video of a monitoring camera in the vicinity, as illustrated in a lower left-hand side portion of FIG. 25. The section display unit 54 may also display a list of vehicles 10 having a high degree of risk, as illustrated in an upper right-hand side portion of FIG. 25. Furthermore, the section display unit 54 may conduct an enlarged display of a vehicle 10 that has been designated by clicking or the like, as illustrated in a lower right-hand side portion of FIG. 25, or may display a screen for remote driving in a case where the vehicle 10 is switched from automated driving to remote driving.

Note that the operation described above of the monitoring unit may be performed by any of the vehicle information reception unit 51, the delay jitter specification unit 52, the section division unit 53, and the section display unit 54. In this case, the monitoring unit may be omitted.

Next, an example of a flow of an operation of the remote monitoring apparatus 50 according to the present second example embodiment is described with reference to FIG. 26.

Figure 26:
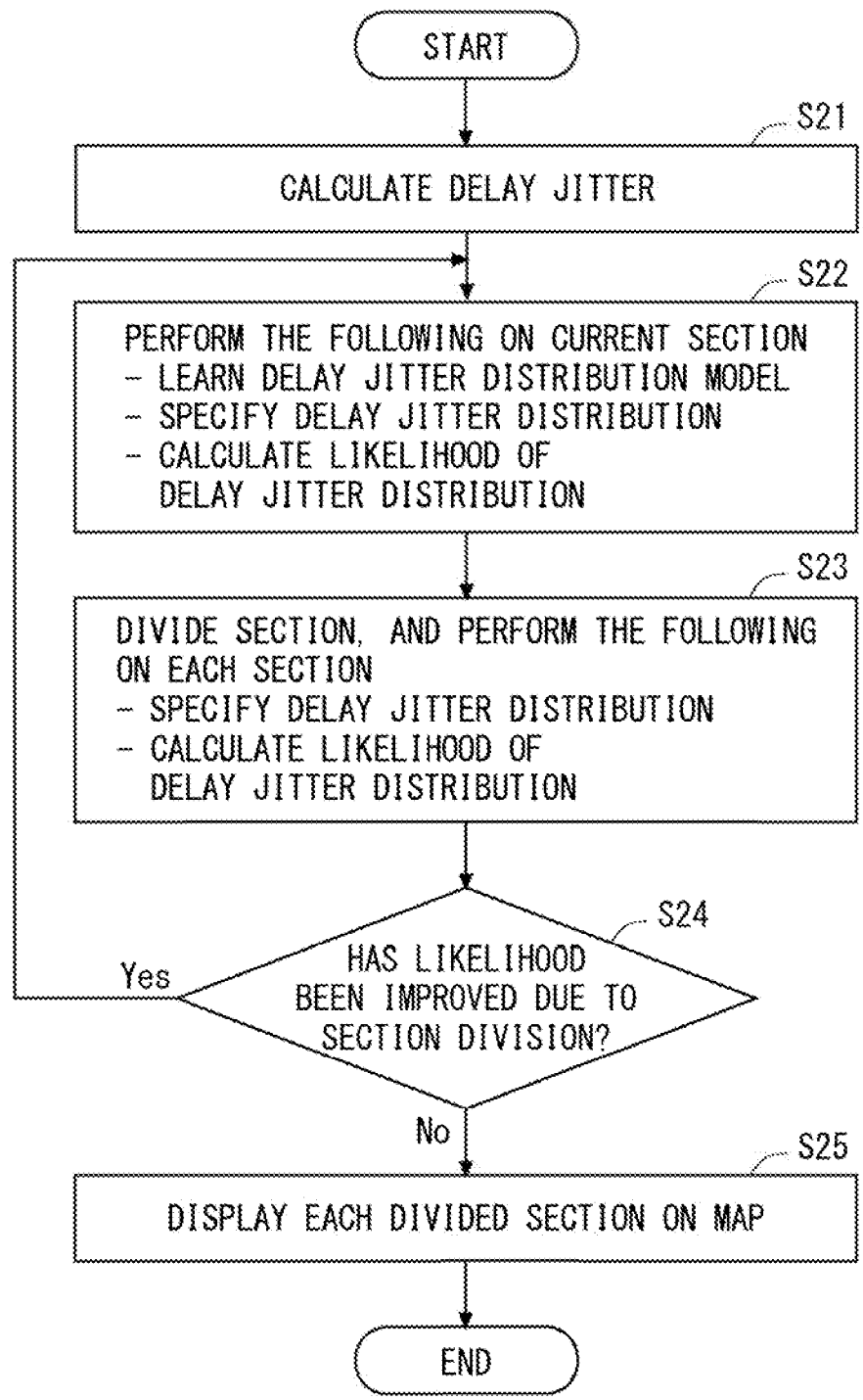
FIG. 26 is a flowchart illustrating an example of a flow of an operation of the remote monitoring apparatus according to the second example embodiment.

As illustrated in FIG. 26, first, the processes of steps S21 to S24 that are similar to the processes of steps S11 to S14 in FIG. 21 according to the first example embodiment described above are performed.

Then, the section display unit 54 displays divided sections obtained by the section division unit 53 on a map indicating a movement section of the vehicle 10 (step S25).

As described above, according to the present second example embodiment, the section display unit 54 displays divided sections obtained by the section division unit 53 on a map indicating a movement section of the vehicle 10. As a result of this, divided sections that have been obtained to be adapted to geographical characteristics such as a position or a movement direction of the vehicle 10 in consideration of features of the respective sections can be reported to a monitoring person that monitors the vehicle.

The other effects are similar to effects according to the first example embodiment described above.

Other Example Embodiments

In the first and second example embodiments described above, the remote monitoring apparatus 50 has divided a movement section of the vehicle 10, and has specified a delay jitter distribution in each of the divided sections, but this is not restrictive. The vehicle 10 may obtain vehicle information from another vehicle 10 directly or through the remote monitoring apparatus 50, and may divide a movement section of the other vehicle 10 and may specify a delay jitter distribution in each of the divided sections. In this case, it is sufficient if the vehicle 10 includes components that correspond to the vehicle information reception unit 51, the delay jitter specification unit 52, and the section division unit 53. Furthermore, the vehicle 10 may monitor another vehicle 10, and may control the other vehicle 10 (for example, the sudden brakes are applied, traveling speed is reduced, or switching is performed from automated driving to remote driving). In this case, it is sufficient if the vehicle 10 further includes components that correspond to the monitoring unit and the section display unit 54 that have been described above.

Concept of Example Embodiments

Next, an example of a configuration of a remote monitoring system 100 that conceptually indicates the remote monitoring systems 1 and 1A according to the first and second example embodiments described above is described with reference to FIG. 27.

Figure 27:
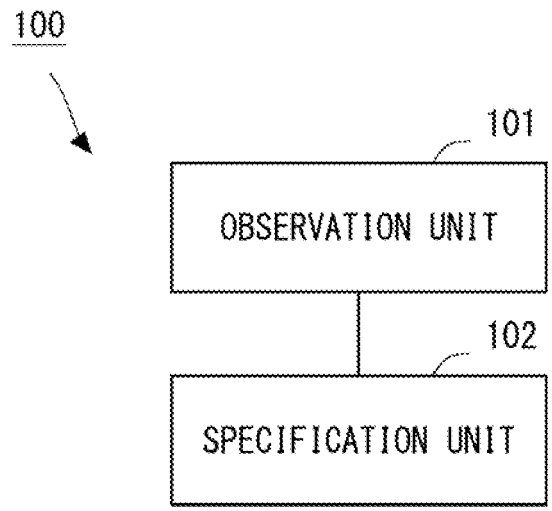
FIG. 27 is a block diagram illustrating an example of a configuration of a remote monitoring system conceptually indicating the example embodiments.

The remote monitoring system 100 illustrated in FIG. 27 includes an observation unit 101 and a specification unit 102.

The observation unit 101 and the specification unit 102 may be provided on any of a side of the remote monitoring apparatus 50 and a side of the vehicle according to the first and second example embodiments described above.

The observation unit 101 corresponds to the delay jitter specification unit 52 according to the first and second example embodiments described above. The observation unit 101 observes traffic in a network that corresponds to a movement section where a mobile object serving as a target to be monitored (for example, a vehicle) moves.

For example, the observation unit 101 observes delay jitter in each position in the movement section where the mobile object moves, as traffic in a network that performs communication with the mobile object.

The specification unit 102 corresponds to the section division unit 53 according to the first and second example embodiments described above. The specification unit 102 divides the movement section of the mobile object on the basis of the traffic observed by the observation unit 101, and specifies a delay jitter distribution in each of the divided sections.

For example, the specification unit 102 divides the movement section of the mobile object in consideration of the delay jitter distribution in each of the divided sections. More specifically, the specification unit 102 specifies a delay jitter distribution, and calculates likelihood in each of the divided sections, by using a traffic model in the movement section of the mobile object. Then, the specification unit 102 divides the movement section in such a way that the total of the likelihoods of the delay jitter distributions in the respective divided sections increases. Note that it is preferable that the traffic model be a model based on a mixed Laplace distribution in which a plurality of Laplace distributions has been mixed.

Furthermore, the remote monitoring system 100 may further include a display unit that displays the divided sections obtained by the specification unit 102 on a map indicating the movement section of the mobile object. This display unit corresponds to the section display unit 54 according to the second example embodiment described above.

Next, an example of a flow of an operation of the remote monitoring system 100 illustrated in FIG. 27 is described with reference to FIG. 28.

Figure 28:
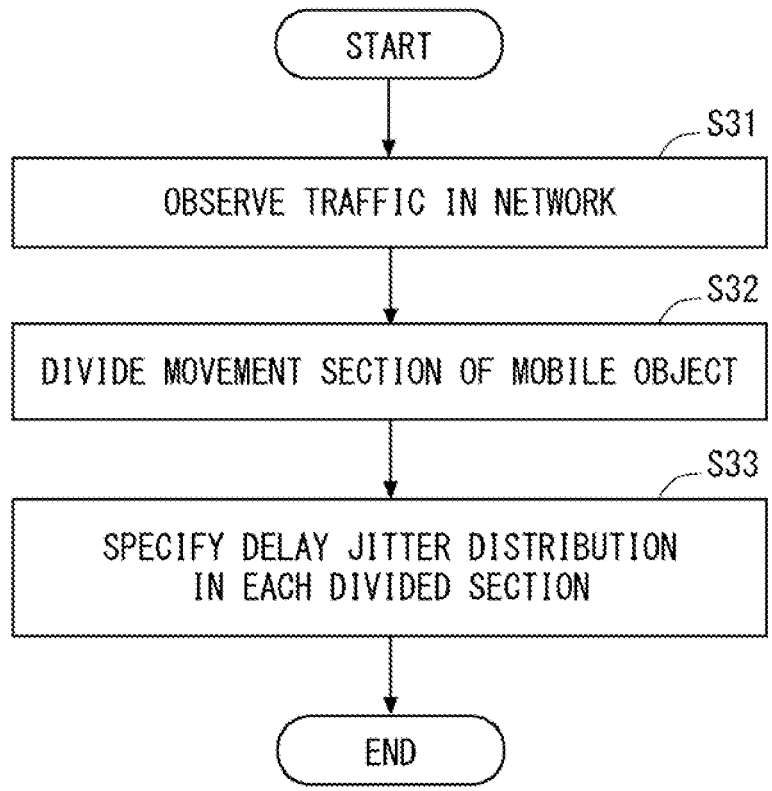
FIG. 28 is a flowchart illustrating an example of a flow of an operation of the remote monitoring system illustrated in FIG. 27.

As illustrated in FIG. 28, first, the observation unit 101 observes traffic in a network that corresponds to a movement section where a mobile object serving as a target to be monitored moves (step S31).

Next, the specification unit 102 divides the movement section of the mobile object on the basis of the traffic observed in step S31 (step S32), and specifies a delay jitter distribution in each of the divided sections (step S33).

As described above, by employing the remote monitoring system 100 illustrated in FIG. 27, the observation unit 101 observes traffic in a network that corresponds to a movement section where a mobile object serving as a target to be monitored moves. The specification unit 102 divides the movement section of the mobile object on the basis of the observed traffic, and specifies a delay jitter distribution in each of the divided sections. As described above, the movement section of the mobile object is divided, and a delay jitter distribution in each of the divided sections is specified. Therefore, a delay jitter distribution that corresponds to geographical characteristics such as a position or a movement direction of the mobile object can be specified.

Hardware Configurations of Remote Monitoring Apparatus and Remote Monitoring System According to Example Embodiments Next, a hardware configuration of a computer 90 that implements the remote monitoring apparatus 50 according to the first and second example embodiments described above, and the remote monitoring system 100 according to the concept of the example embodiments described above is described with reference to FIG. 27.

Figure 29:
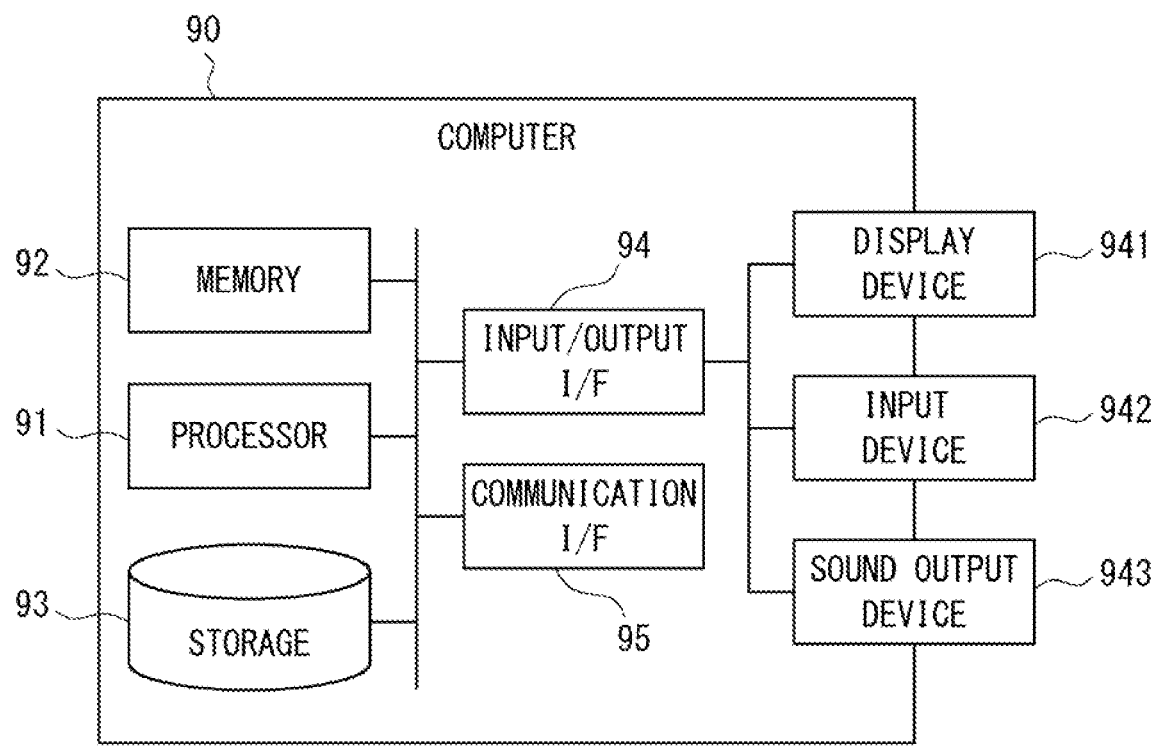
FIG. 29 is a block diagram illustrating an example of a hardware configuration of a computer that implements the remote monitoring apparatus and the remote monitoring system according to the example embodiments.

As illustrated in FIG. 29, the computer 90 includes a processor 91, a memory 92, a storage 93, an input/output interface (an input/output I/F) 94, a communication interface (a communication I/F) 95, and the like. The processor 91, the memory 92, the storage 93, the input/output interface 94, and the communication interface 95 are connected by a data transmission line for mutually transmitting or receiving data.

The processor 91 is an arithmetic processing device such as a central processing unit (CPU) or a graphics processing unit (GPU). The memory 92 is a memory such as a random access memory (RAM) or a read only memory (ROM). The storage 93 is a storage device such as a hard disk drive (HDD), a solid state drive (SSD), or a memory card. Furthermore, the storage 93 may be a memory such as a RAM or a ROM.

The storage 93 stores programs that achieve functions of components included in the remote monitoring apparatus 50 and the remote monitoring system 100. The processor 91 executes each of these programs, and therefore each of the functions of the components included in the remote monitoring apparatus 50 and the remote monitoring system 100 is achieved. Here, in executing each of the programs described above, the processor 91 may load these programs into the memory 92, and may execute the programs, or may execute the programs without loading the programs into the memory 92. Furthermore, the memory 92 or the storage 93 also plays a role of storing information or data that is held by the components included in the remote monitoring apparatus 50 and the remote monitoring system 100.

Furthermore, the programs described above can be stored by using various types of non-transitory computer readable media, and can be supplied to a computer (including the computer 90). The non-transitory computer readable media include various types of tangible storage media. Examples of the non-transitory computer readable medium include a magnetic storage medium (for example, a flexible disk, a magnetic tape, or a hard disk drive), a magneto-optical storage medium (for example, a magneto-optical disk), a compact disc-ROM (CD-ROM), a CD-recordable (CD-R), a CD-rewritable (CD-R/W), and a semiconductor memory (for example, a mask ROM, a programmable ROM (PROM), an erasable PROM (EPROM), a flash ROM, or a RAM. Furthermore, the programs may be supplied to the computer by various types of transitory computer readable media. Examples of the transitory computer readable medium include an electric signal, an optical signal, and electromagnetic waves. The transitory computer readable medium can supply the programs to the computer via a wired communication line such as electric wires and optical fibers, or a wireless communication line.

The input/output interface 94 is connected to a display device 941, an input device 942, a sound output device 943, or the like. The display device 941 is a device that displays a screen that corresponds to drawing data that has been processed by the processor 91, such as a liquid crystal display (LCD), a cathode ray tube (CRT) display, or monitor. The input device 942 is a device that receives an input of an operation performed by an operator, and is, for example, a keyboard, a mouse, a touch sensor, and the like. The display device 941 and the input device 942 may be integrated, and may be implemented as a touch panel. The sound output device 943 is a device that acoustically outputs sound that corresponds to acoustic data that has been processed by the processor 91, such as a speaker.

The communication interface 95 transmits or receives data to/from an external device. For example, the communication interface 95 performs communication with an external device via the wired communication line or the wireless communication line.

The present disclosure has been described above with reference to the example embodiments, but the present disclosure is not limited to the example embodiments described above. Various modifications that could be understood by those skilled in the art can be made to the configuration and details of the present disclosure within the scope of the present disclosure.

Furthermore, part or the entirety of the example embodiments described above can also be described as described in the following supplementary notes, but is not limited to the following.

(Supplementary Note 1)

An observation unit configured to observe traffic in a network that corresponds to a movement section where a mobile object moves, the mobile object serving as a target to be monitored; and a specification unit configured to divide the movement section on the basis of the traffic that has been observed, and specify a delay jitter distribution in each divided section are included.

(Supplementary Note 2)

The remote monitoring apparatus according to Supplementary Note 1, in which the observation unit observes, as the traffic, delay jitter in each position of the movement section.

(Supplementary Note 3)

The remote monitoring apparatus according to Supplementary Note 1 or 2, in which
the specification unit performs:
dividing the movement section in consideration of the delay jitter distribution in each of the divided sections.

(Supplementary Note 4)

The remote monitoring apparatus according to Supplementary Note 1 or 2, in which
the specification unit performs:
specifying the delay jitter distribution and calculating a likelihood in each of the divided sections, by using a traffic model in the movement section; and
dividing the movement section in such a way that a total of the likelihood of the delay jitter distribution in each of the divided sections increases.

(Supplementary Note 5)

The remote monitoring apparatus according to Supplementary Note 4, in which the traffic model is a model based on a mixed Laplace distribution in which a plurality of Laplace distributions has been mixed.

(Supplementary Note 6)

The remote monitoring apparatus according to any one of Supplementary Notes 1 to 5, further including a display unit configured to display each of the divided sections of the movement section on a map indicating the movement section.

(Supplementary Note 7)

The remote monitoring apparatus according to any one of Supplementary Notes 1 to 6, further including a monitoring unit configured to calculate a degree of risk of the mobile object that moves in each of the divided sections, and control the mobile object.

(Supplementary Note 8)

A remote monitoring method including:
a first step of observing traffic in a network that corresponds to a movement section where a mobile object moves, the mobile object serving as a target to be monitored; and
a second step of dividing the movement section on the basis of the traffic that has been observed, and specifying a delay jitter distribution in each divided section.

(Supplementary Note 9)

The remote monitoring method according to Supplementary Note 8, in which in the first step, delay jitter in each position of the movement section is observed as the traffic.

(Supplementary Note 10)

The remote monitoring method according to Supplementary Note 8 or 9, in which
in the second step,
the movement section is divided in consideration of the delay jitter distribution in each of the divided sections.

(Supplementary Note 11)

The remote monitoring method according to Supplementary Note 8 or 9, in which
in the second step,
the delay jitter distribution is specified and a likelihood is calculated in each of the divided sections, by using a traffic model in the movement section, and
the movement section is divided in such a way that a total of the likelihood of the delay jitter distribution in each of the divided sections increases.

(Supplementary Note 12)

The remote monitoring method according to Supplementary Note 11, in which the traffic model is a model based on a mixed Laplace distribution in which a plurality of Laplace distributions has been mixed.

(Supplementary Note 13)

The remote monitoring method according to any one of Supplementary Notes 8 to 12, further including a third step of displaying each of the divided sections of the movement section on a map indicating the movement section.

(Supplementary Note 14)

The remote monitoring method according to any one of Supplementary Notes 8 to 13, further including a fourth step of calculating a degree of risk of the mobile object that moves in each of the divided sections, and control the mobile object.

(Supplementary Note 15)

A remote monitoring system including:
an observation unit configured to observe traffic in a network that corresponds to a movement section where a mobile object moves, the mobile object serving as a target to be monitored; and
a specification unit configured to divide the movement section on the basis of the traffic that has been observed, and specify a delay jitter distribution in each divided section.

(Supplementary Note 16)

The remote monitoring system according to Supplementary Note 15, in which the observation unit observes, as the traffic, delay jitter in each position of the movement section.

(Supplementary Note 17)

The remote monitoring system according to Supplementary Note 15 or 16, in which
the specification unit performs:
dividing the movement section in consideration of the delay jitter distribution in each of the divided sections.

(Supplementary Note 18)

The remote monitoring system according to Supplementary Note 15 or 16, in which
the specification unit performs:
specifying the delay jitter distribution and calculating a likelihood in each of the divided sections, by using a traffic model in the movement section; and
dividing the movement section in such a way that a total of the likelihood of the delay jitter distribution in each of the divided sections increases.

(Supplementary Note 19)

The remote monitoring system according to Supplementary Note 18, in which the traffic model is a model based on a mixed Laplace distribution in which a plurality of Laplace distributions has been mixed.

(Supplementary Note 20)

The remote monitoring system according to any one of Supplementary Notes 15 to 19, further including a display unit configured to display each of the divided sections of the movement section on a map indicating the movement section.

(Supplementary Note 21)

The remote monitoring system according to any one of Supplementary Notes 15 to 20, further including a monitoring unit configured to calculate a degree of risk of the mobile object that moves in each of the divided sections, and control the mobile object.

REFERENCE SIGNS LIST 1, 1A REMOTE MONITORING SYSTEM
10 VEHICLE
10X MOBILE OBJECT
11 VEHICLE INFORMATION SPECIFICATION UNIT
12 VEHICLE INFORMATION TRANSMISSION UNIT
20 BASE STATION

30 INTERNET
40 CLOUD
50 REMOTE MONITORING APPARATUS
51 VEHICLE INFORMATION RECEPTION UNIT
52 DELAY JITTER SPECIFICATION UNIT
53 SECTION DIVISION UNIT
54 SECTION DISPLAY UNIT
90 COMPUTER
91 PROCESSOR
92 MEMORY
93 STORAGE
94 INPUT/OUTPUT INTERFACE
941 DISPLAY DEVICE
942 INPUT DEVICE
943 SOUND OUTPUT DEVICE
95 COMMUNICATION INTERFACE
100 REMOTE MONITORING SYSTEM
101 OBSERVATION UNIT
102 SPECIFICATION UNIT

What is claimed is:

1. A remote monitoring apparatus comprising:
at least one memory storing instructions, and
at least one processor configured to execute the instructions to;
observe traffic in a network that corresponds to a movement section where a mobile object moves, the mobile object serving as a target to be monitored; and
divide the movement section on the basis of the traffic that has been observed, and specify a delay jitter distribution in each divided section.

2. The remote monitoring apparatus according to claim 1, wherein the at least one processor is further configured to execute the instructions to observe, as the traffic, delay jitter in each position of the movement section.

3. The remote monitoring apparatus according to claim 1, wherein
the at least one processor is further configured to execute the instructions to;
divide the movement section in consideration of the delay jitter distribution in each of the divided sections.

4. The remote monitoring apparatus according to claim 1, wherein
the at least one processor is further configured to execute the instructions to;
specify the delay jitter distribution and calculating a likelihood in each of the divided sections, by using a traffic model in the movement section; and
divide the movement section in such a way that a total of the likelihood of the delay jitter distribution in each of the divided sections increases.

5. The remote monitoring apparatus according to claim 4, wherein the traffic model is a model based on a mixed Laplace distribution in which a plurality of Laplace distributions has been mixed.

6. The remote monitoring apparatus according to claim 1, further comprising a display unit configured to display each of the divided sections of the movement section on a map indicating the movement section.

7. A remote monitoring method comprising:
a first step of observing traffic in a network that corresponds to a movement section where a mobile object moves, the mobile object serving as a target to be monitored; and
a second step of dividing the movement section on the basis of the traffic that has been observed, and specifying a delay jitter distribution in each divided section.

8. The remote monitoring method according to claim 7, wherein in the first step, delay jitter in each position of the movement section is observed as the traffic.

9. The remote monitoring method according to claim 7, wherein
in the second step,
the movement section is divided in consideration of the delay jitter distribution in each of the divided sections.

10. The remote monitoring method according to claim 7, wherein
in the second step,
the delay jitter distribution is specified and a likelihood is calculated in each of the divided sections, by using a traffic model in the movement section, and
the movement section is divided in such a way that a total of the likelihood of the delay jitter distribution in each of the divided sections increases.

11. The remote monitoring method according to claim 10, wherein the traffic model is a model based on a mixed Laplace distribution in which a plurality of Laplace distributions has been mixed.

12. The remote monitoring method according to claim 7, further comprising a third step of displaying each of the divided sections of the movement section on a map indicating the movement section.

13. A remote monitoring system comprising:
an observation unit configured to observe traffic in a network that corresponds to a movement section where a mobile object moves, the mobile object serving as a target to be monitored; and
a specification unit configured to divide the movement section on the basis of the traffic that has been observed, and specify a delay jitter distribution in each divided section.

14. The remote monitoring system according to claim 13, wherein the observation unit observes, as the traffic, delay jitter in each position of the movement section.

15. The remote monitoring system according to claim 13, wherein
the specification unit performs:
dividing the movement section in consideration of the delay jitter distribution in each of the divided sections.

16. The remote monitoring system according to claim 13, wherein
the specification unit performs:
specifying the delay jitter distribution and calculating a likelihood in each of the divided sections, by using a traffic model in the movement section; and
dividing the movement section in such a way that a total of the likelihood of the delay jitter distribution in each of the divided sections increases.

17. The remote monitoring system according to claim 16, wherein the traffic model is a model based on a mixed Laplace distribution in which a plurality of Laplace distributions has been mixed.

18. The remote monitoring system according to claim 13, further comprising a display unit configured to display each of the divided sections of the movement section on a map indicating the movement section.

* * * * *